United States Patent
Farhadiroushan et al.

(10) Patent No.: US 10,677,642 B2
(45) Date of Patent: Jun. 9, 2020

(54) FLEXIBLE SUBSTRATE FIBER OPTIC SENSING MAT FOR DISTRIBUTED ACOUSTIC SENSING

(71) Applicant: Silixa Ltd., Elstree, Hertfordshire (GB)

(72) Inventors: Mahmoud Farhadiroushan, Elstree (GB); Veronique Mahue, Elstree (GB); Tom Parker, Elstree (GB); Sergey Shatalin, Elstree (GB)

(73) Assignee: Silixa Ltd., Elstree Hertfordshire (GB)

( * ) Notice: Subject to any disclaimer, the term of this patent is extended or adjusted under 35 U.S.C. 154(b) by 81 days.

(21) Appl. No.: 15/507,111

(22) PCT Filed: Aug. 20, 2015

(86) PCT No.: PCT/GB2015/052425
§ 371 (c)(1),
(2) Date: Feb. 27, 2017

(87) PCT Pub. No.: WO2016/030667
PCT Pub. Date: Mar. 3, 2016

(65) Prior Publication Data
US 2017/0248462 A1    Aug. 31, 2017

(30) Foreign Application Priority Data
Aug. 28, 2014 (GB) .................................. 1415262.3

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC ........................... G01H 9/004; G01D 5/35358
(Continued)

(56) References Cited

U.S. PATENT DOCUMENTS

| 5,253,222 A | 10/1993 | Danver et al. |
| 5,394,378 A | 2/1995 | Dandridge et al. |

(Continued)

FOREIGN PATENT DOCUMENTS

| DE | 102008013052 A1 | 9/2008 |
| EP | 1088209 B1 | 11/2004 |

(Continued)

OTHER PUBLICATIONS

Translation WO9967613 (Year: 1999) (Year: 1999) (Year: 1999) (Year: 1999) (Year: 1999) (Year: 1999).*

(Continued)

*Primary Examiner* — Natalie Huls
*Assistant Examiner* — Monica S Young
(74) *Attorney, Agent, or Firm* — Honigman LLP; Matthew H. Szalach; Jonathan P. O'Brien

(57) ABSTRACT

A prefabricated mat-like structure having lengths of fiber mounted thereon or therein in a predetermined deployment pattern that provides a high spatial density of fiber to give increased spatial sensing resolution is described. The prefabricated mat-like structures may be very easily deployed by being placed against and/or wrapped around an object to be monitored, typically being fastened in place by clamps or the like. In addition, easy removal from the object is also obtained, by simply unfastening the mat-like structure, which may then be redeployed elsewhere. The prefabricated mat-like structure having the fiber already mounted thereon or therein therefore provides a very convenient and easily installable and removable solution.

20 Claims, 23 Drawing Sheets

(58) Field of Classification Search
USPC ........................................................ 73/655
See application file for complete search history.

(56) References Cited

U.S. PATENT DOCUMENTS

| | | | |
|---|---|---|---|
| 5,589,937 A | 12/1996 | Brininstool | |
| 5,825,489 A * | 10/1998 | Lagakos | G01H 9/004 356/477 |
| 5,996,416 A | 12/1999 | Eguchi | |
| 2003/0183294 A1* | 10/2003 | Carlson | A61M 16/08 138/129 |
| 2006/0261259 A1* | 11/2006 | Beinhocker | G01J 1/04 250/227.15 |
| 2007/0145251 A1* | 6/2007 | Ogura | G01J 1/04 250/227.14 |
| 2008/0144992 A1* | 6/2008 | Thompson | A61B 5/1126 385/13 |
| 2008/0227349 A1* | 9/2008 | Eyck | A41D 13/1281 442/60 |
| 2008/0253712 A1* | 10/2008 | Allen | D03D 15/00 385/12 |
| 2009/0067777 A1* | 3/2009 | Beinhocker | F17D 5/00 385/12 |
| 2011/0058767 A1* | 3/2011 | Ishibashi | G01B 11/18 385/12 |
| 2011/0108477 A1* | 5/2011 | Hammer | B01D 29/111 210/499 |
| 2013/0341497 A1* | 12/2013 | Zuardy | G01D 5/35358 250/227.14 |
| 2015/0310964 A1* | 10/2015 | Larson | G02B 6/441 174/71 R |
| 2016/0069793 A1* | 3/2016 | Saito | G01D 5/35351 73/705 |
| 2017/0276648 A1* | 9/2017 | Takahashi | B29C 59/022 |

FOREIGN PATENT DOCUMENTS

| | | | | |
|---|---|---|---|---|
| EP | 2803950 A1 | 11/2014 | | |
| GB | 2505424 A | 3/2014 | | |
| JP | 2004257772 A | 9/2004 | | |
| WO | WO-9967613 A1 * | 12/1999 | | G01L 1/242 |
| WO | WO-2008011058 A2 | 1/2008 | | |

OTHER PUBLICATIONS

European Patent Office as the International Searching Authority, International Search Report and Written Opinion for Application No. PCT/GB2015/052425 dated Dec. 4, 2015.

Intellectual Propery Office, Patents Act 1977: Search Report under Section 17(5) for Application No. GB1415262.3, dated Dec. 5, 2014.

Intellectual Propery Office, Patents Act 1977: Search Report under Section 17(5) for Application No. GB1415262.3, dated Apr. 22, 2015.

Intellectual Propery Office, Patents Act 1977: Search Report under Section 17(5) for Application No. GB1415262.3, dated Sep. 22, 2017.

* cited by examiner

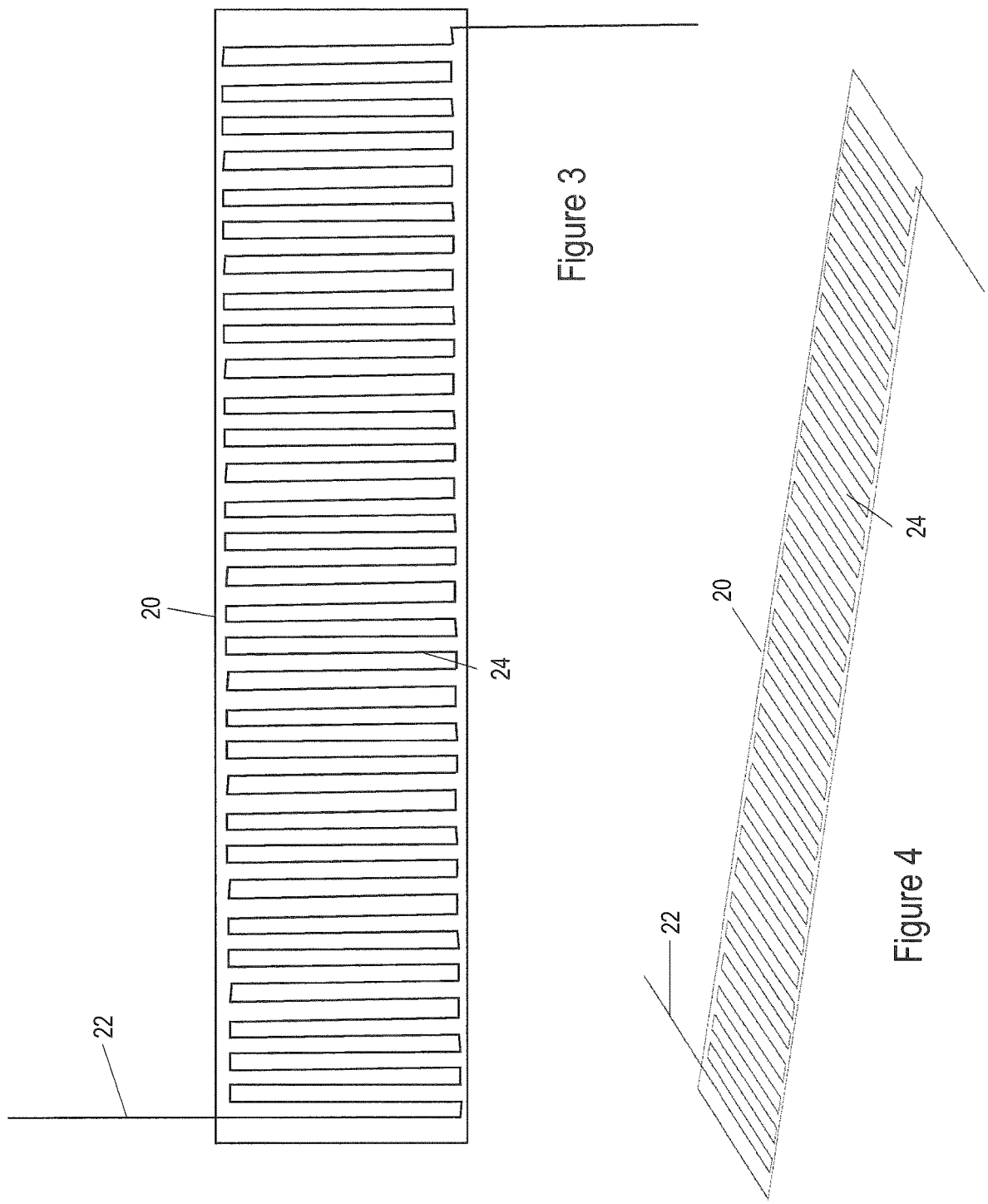

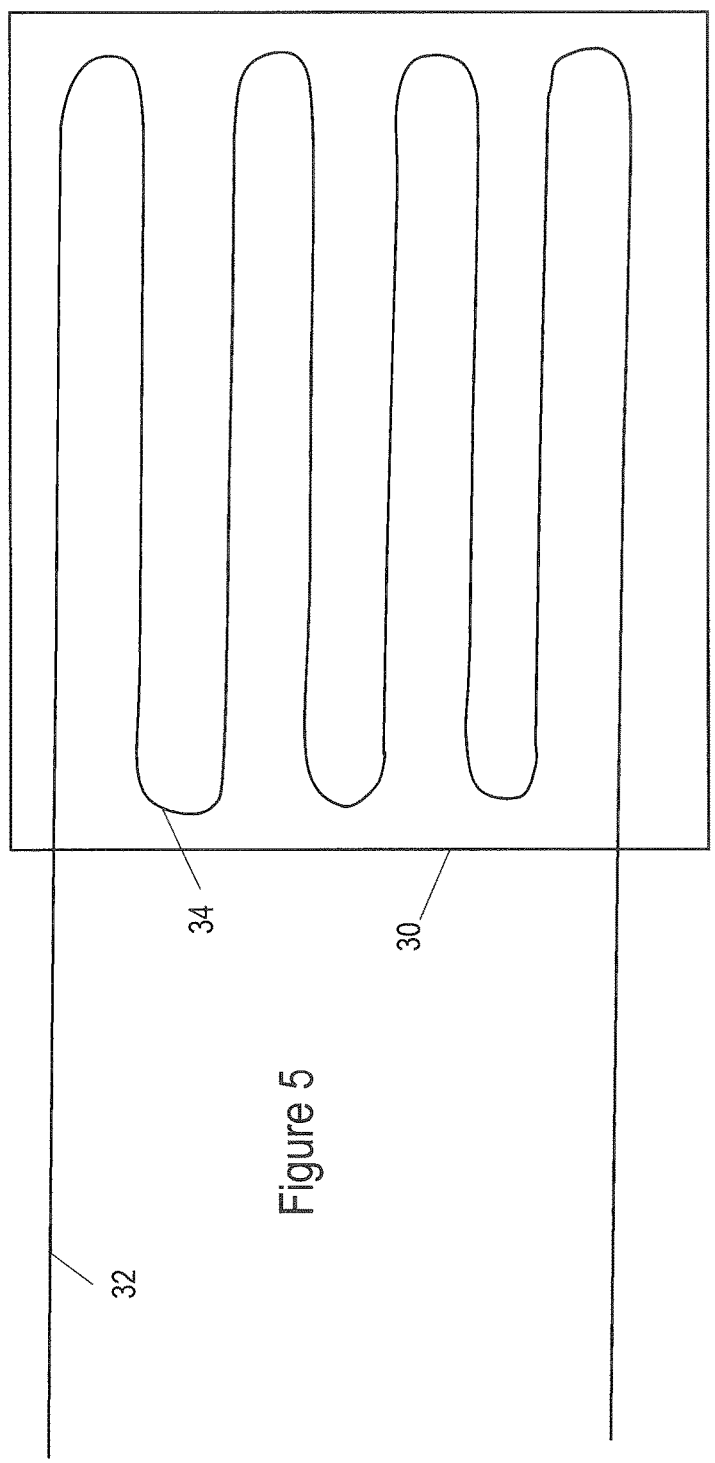
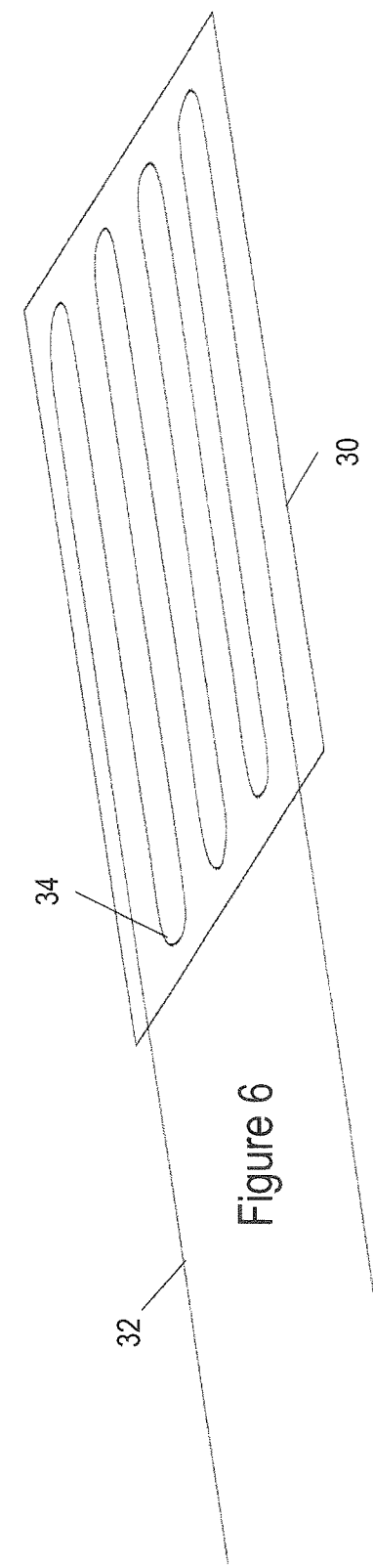

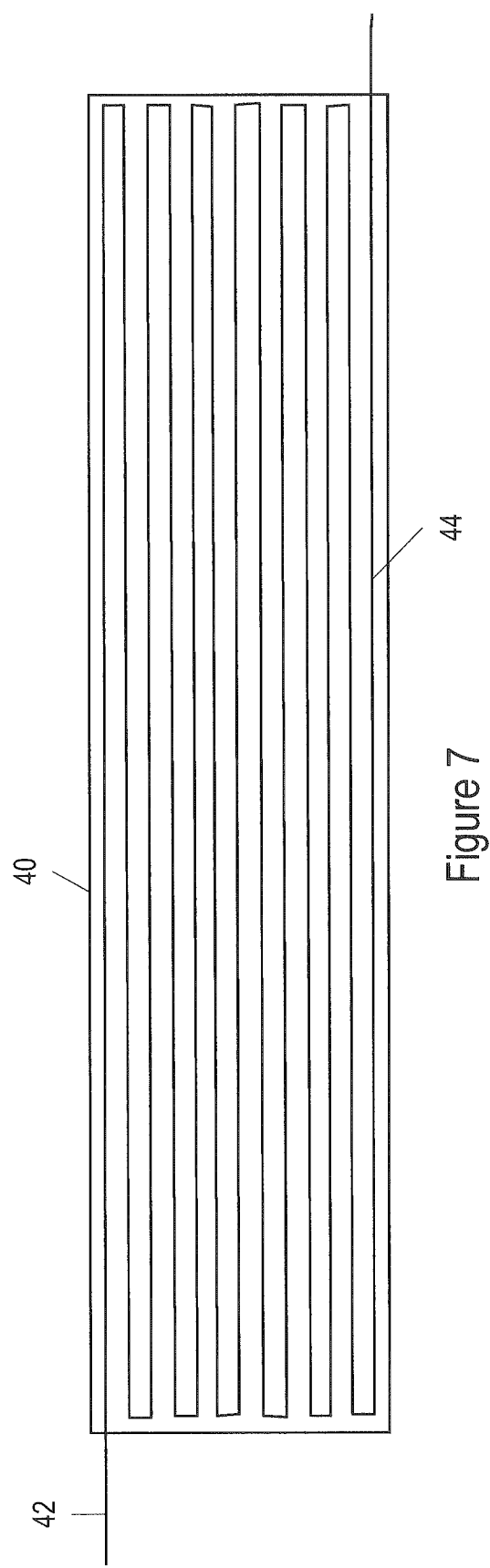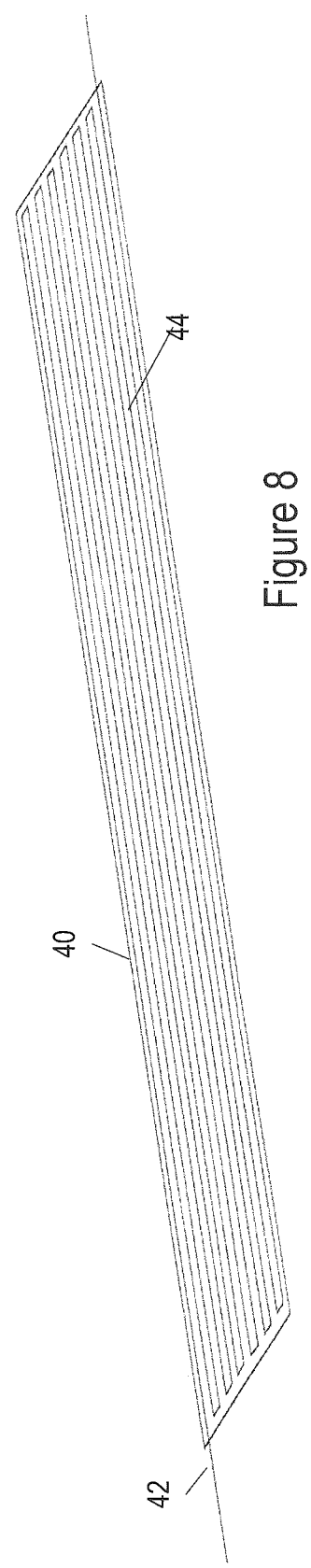
Figure 7
Figure 8

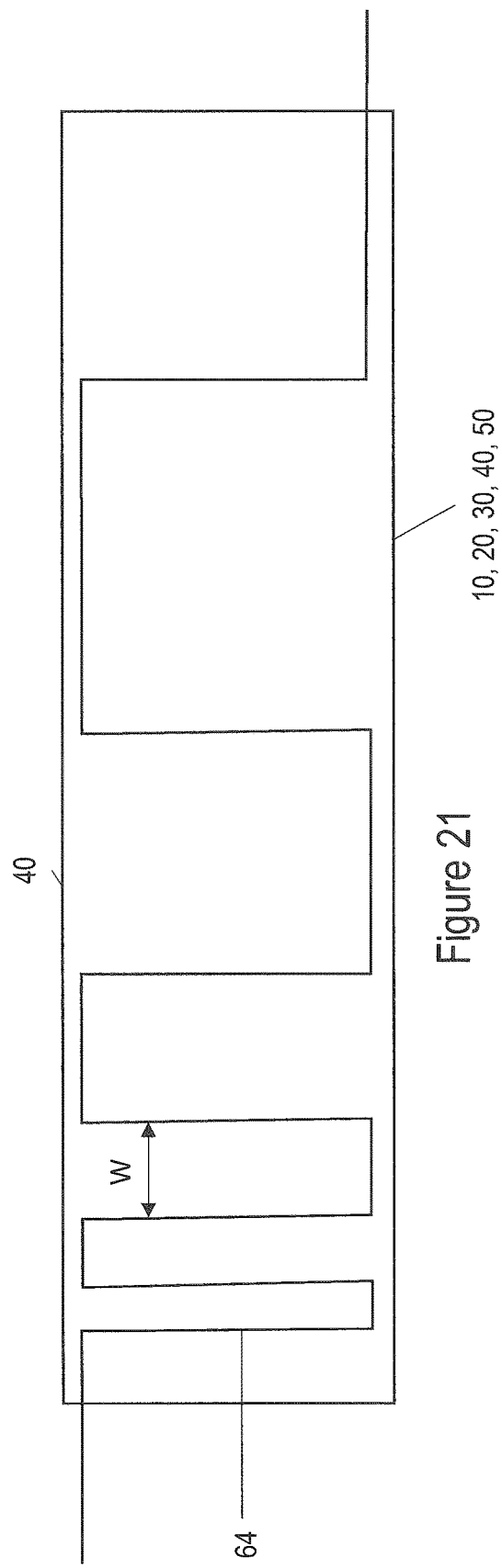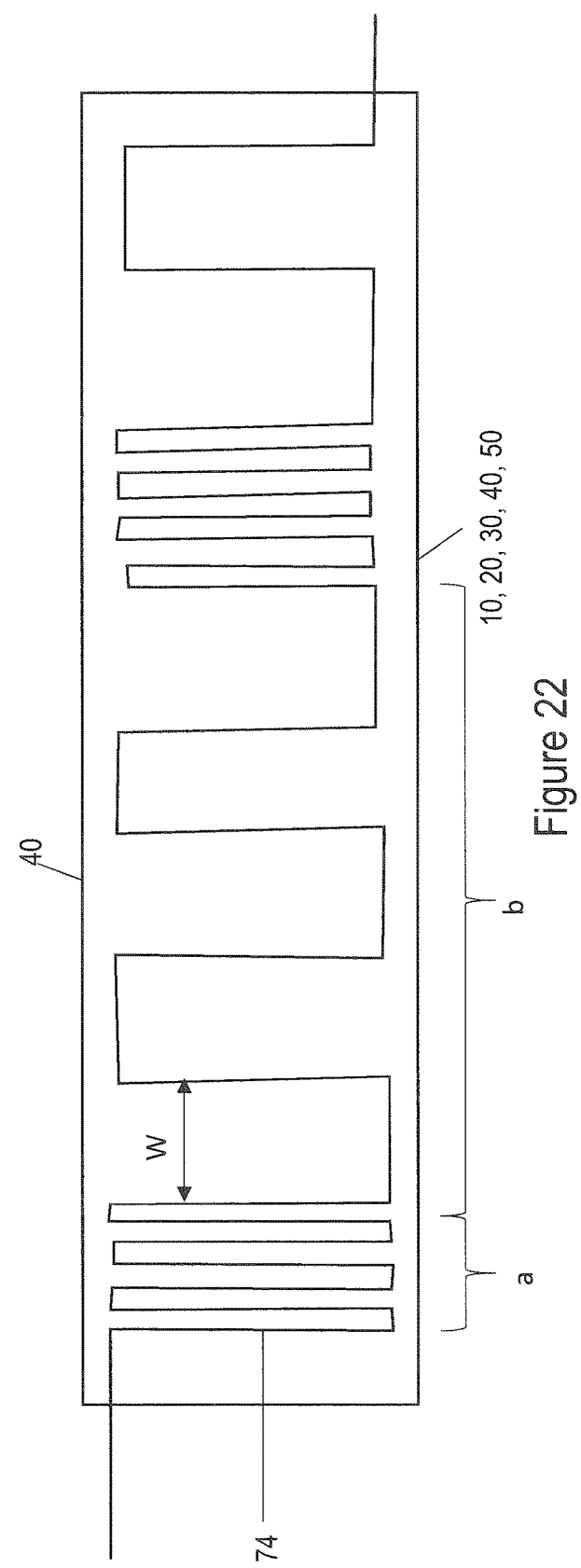

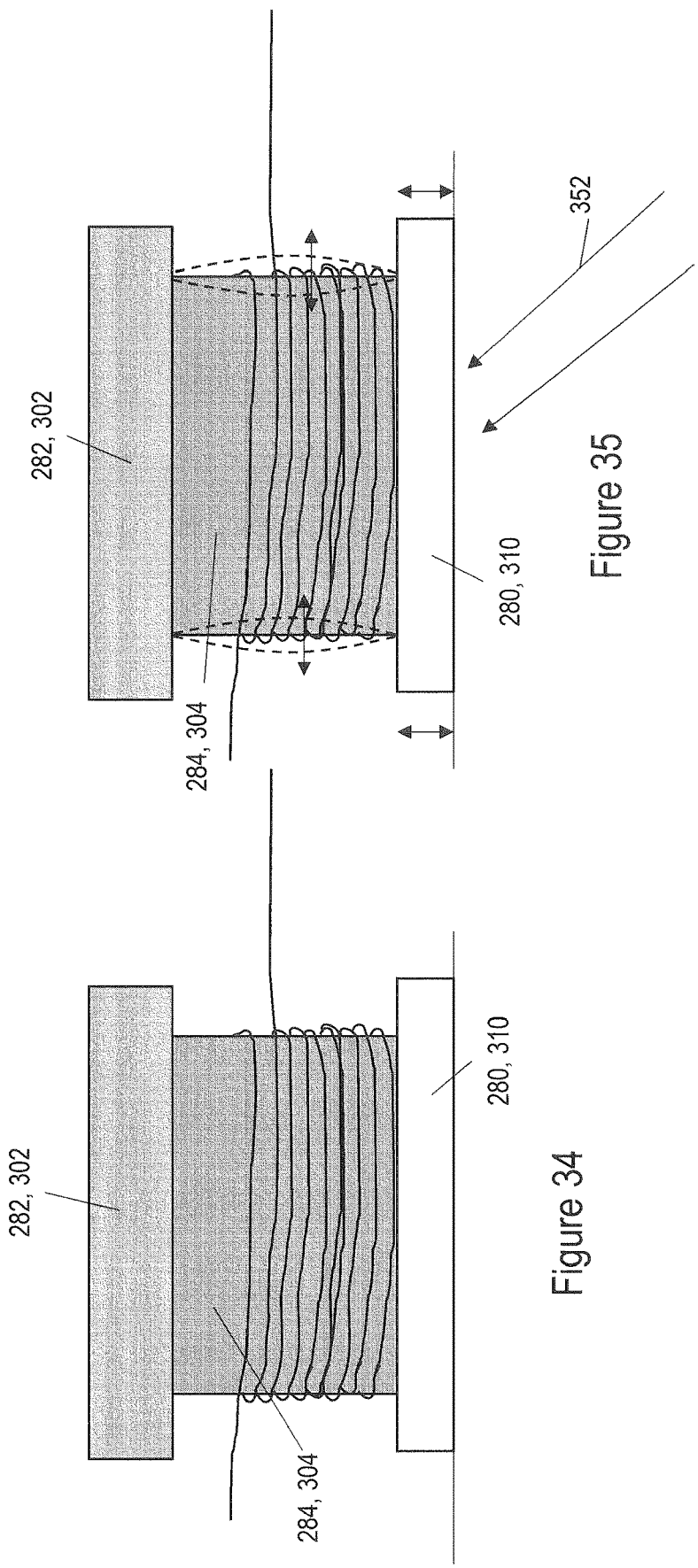

FLEXIBLE SUBSTRATE FIBER OPTIC SENSING MAT FOR DISTRIBUTED ACOUSTIC SENSING

CROSS-REFERENCE TO RELATED APPLICATIONS

This application claims priority under 35 U.S.C. § 371 to Patent Cooperation Treaty Application No. PCT/GB2015/052425, filed Aug. 20, 2015, which claims priority to GB Application No. 1415262.3, filed Aug. 28, 2014, the entire contents of which are incorporated herein by reference.

TECHNICAL FIELD

The present invention relates to a flexible mat-like substrate upon which lengths of optical fiber may be mounted or embedded for use with an optical fiber based distributed acoustic sensor.

BACKGROUND TO THE INVENTION AND PRIOR ART

Optical fiber based distributed acoustic sensors (DAS) are known in the art. One high performance example is the iDAS™, available from Silixa Limited, of Elstree, UK. Further details of the operation of a suitable DAS are given in WO2010/0136809 and WO2010/136810, which also disclose that distributed acoustic sensors may be used for in-well applications, in that the acoustic noise profile can be used to measure the flow by noise logging at every location along the well. In addition, the noise spectrum can be used to identify the phase of the fluid.

Flow monitoring in wells, pipes, or other fluid carrying structures using eddy tracking is a technique that shows some promise. A DAS system is typically used to detect the noise generated by an eddy in the fluid carrying structure and to track the noise along the structure as the eddy moves with the flow. From this tracking, knowledge of the flow velocity can be obtained.

A typical eddy lifetime is usually long enough for the eddy to move along the structure with the flow for two or three diameters of the structure i.e. two to three pipe diameters in the case of a pipe. However, the typical native sensing resolution of an optical fiber based DAS is around 5 m, although the best in class sensors, such as the iDAS™ sensor available from Silixa Limited, of Elstree, UK can achieve sensing resolutions of around 1 m along lengths of fiber up to 50 km in length. Even with such high spatial sensing resolution, however, in typical pipes the eddy lifetime is shorter than the highest spatial sensing resolution when the optical fiber is deployed linearly along the pipe or structure to be monitored.

To try and get around this issue, in WO2010/136810 we described how an optical fiber might be helically wrapped around a section of pipe or a well. This results in there being a greater length of fiber in the particular section of the pipe around which the fiber is wrapped, and hence increases the spatial sensitivity of the DAS system in that section. For example, for a 30 cm pipe with a 1 m native sensing resolution, in the helically wrapped section the DAS would be able to make a discrete acoustic measurement for approximately every turn of fiber. The longitudinal sensing resolution along the pipe is therefore vastly increased.

However, wrapping fiber around a pipe or other fluid carrying vessel as described is costly, and depending on the environment and installation conditions, may not be technically or economically feasible. In addition, once installed, such sections of wrapped fiber can be difficult to remove intact, requiring unwinding from around the pipe. A more user friendly and economic way of providing high density sections of fiber for pipe or other fluid carrying vessel monitoring is therefore required.

WO2008/011058 describes a fiber-optic mat sensor wherein optical fiber is distributed about a support structure such as a mat fabricated from appropriate flexible material. The distributed optical fiber includes multiple fiber optic bends, which in one embodiment follow a circuitous route. The mat sensor is intended for use as a baby monitor, to detect baby movements. However, no detailed disclosure is provided as to precisely how the fiber is distributed across the mat, for example so as to minimise fiber bending losses, or to improve sensitivity in particular areas of the mat. Several issues therefore remain to be resolved to provide a practical, optimised fiber-optic mat sensor.

SUMMARY OF THE INVENTION

In order to address the above, embodiments of the present invention provide a prefabricated mat-like structure having lengths of fiber mounted thereon or therein in a predetermined deployment pattern that provides a high spatial density of fiber to give increased spatial sensing resolution. The prefabricated mat-like structures may be very easily deployed by being placed against and/or wrapped around an object to be monitored, typically being fastened in place by clamps or the like. In addition, easy removal from the object is also obtained, by simply unfastening the mat-like structure, which may then be redeployed elsewhere. The prefabricated mat-like structure having the fiber already mounted thereon or therein therefore provides a very convenient and easily installable and removable solution that address the above noted problems of the prior art.

In view of the above, from one aspect there is provided a flexible mat-like substrate having a length of optical fiber mounted thereon or therein for use in an optical fiber sensor system, the length of the optical fiber being arranged in a deployment pattern on or in said substrate so as to provide a sensing area comprising said deployment pattern of increased spatial sensing resolution than the native sensing resolution otherwise provided by the fiber to the optical fiber sensing system.

In one embodiment the sensing area includes one or more areas where the deployment pattern of the fiber reciprocates back and forth across the substrate from substantially one side of the substrate to another side. For example, the deployment pattern may reciprocate from a first side to an opposite second side, or from a first side to an adjacent second side.

In one embodiment the substrate has an aspect ratio of length to width such that it is substantially longer than it is wide. Preferably the length of the substrate is at least 4 times, or more preferably at least 6 times, or even more preferably at least 10 times the width of the substrate.

In one embodiment the deployment pattern reciprocates back and forth across the mat-like substrate substantially in alignment with the long side of the substrate, whereas in another embodiment the deployment pattern reciprocates back and forth across the mat-like substrate substantially in alignment with the short side of the substrate.

A plurality of flexible mat-like substrates as described above may be provided, connected in series by a common optical fiber. For example, 3 or more flexible mat-like substrates may be connected in series. In some embodiments the flexible mat-lie substrates may be all of the same type.

Another aspect of the invention provides an optical fiber mounting apparatus for an optical fiber sensing system, comprising: one or more peg or barrel type structures having a length of optical fiber wound at least partially therearound; and a carrier substrate for the one or more peg or barrel type structures arranged to allow the structures to be held in place at a location to be monitored; the arrangement of the peg or barrel type structures being such that incident acoustic vibrations cause the outer surface or surfaces around which the optical fiber is wound to vibrate, said vibrations being transmitted to the length of optical fiber wound therearound.

With such an arrangement the peg or barrel acts as an effective transducer to convert incident acoustic vibrations into corresponding strain on the optical fiber over a large length of fiber, particularly where there are multiple windings. The strain in the fiber manifests itself as backscatter, that can be detected in a suitable distributed acoustic sensor (DAS) system.

In a preferred embodiment the optical fiber is wound completely around the peg or barrel structure a plurality of times. This allows a greater length of fiber to subject to the same vibrations, and hence by integrating the backscatter from along the greater length of fiber the signal to noise ratio can be increased.

In one embodiment a plurality of peg or barrel type structures arranged in an array is provided, the optical fiber being at least partially wound round at least two or more of the peg or barrel type structures. The optical fiber may be wound between the two or more peg or barrel type structures in a figure of eight formation, or alternatively may be wound around the two or more peg or barrel type structures in turn such that the fiber is wound around a first one of the peg or barrel type structures, and then extends to the second of the peg or barrel type structures.

In one embodiment the fiber is wound around 3 or more consecutive peg or barrel type structures either in a figure of eight or in turn. It is helpful to wind the fiber around a larger number of pegs to provide a greater sensing length for some applications that involve long wavelengths to be detected, for example in seismic applications. Conversely, where the apparatus is being used to detect local acoustic vibrations, for example when used for flow monitoring, then the fiber may be wrapped around only one or a smaller number e.g. 2 of the peg or barrel structures, as only local detection is required. More generally, the fiber is wound around a larger number of consecutive pegs or barrels when the apparatus is to be used to detect seismic vibrations than when it is to be used to detect local acoustic vibrations.

In one embodiment an inertial mass is located on top of the one or more peg or barrel type structures against which the structures abut. The inertial mass preferably has a much greater inertia and/or mass e.g. 5, 10, or 20 times as much as the peg or barrel, such that it effectively acts as a barrier against which the peg or barrel can compress in response to incident acoustic energy. As described above, he compression widens the peg or barrel, translating the incident acoustic vibrations into changes in strain in the fiber, that can be detected via the thus modulated backscatter.

Typically the peg or barrel type structures have a diameter of at least 1 cm, although this can be larger in other embodiments, for example, 5 cm, 10 cm, or 20 cm. In some embodiments the peg or barrel type structures are formed from an elastomeric material, to allow them to expand when in compression due to the incident acoustic energy, although this is not essential, and other more rigid materials may be used.

Various other features, aspects and arrangements according to embodiments of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein:

FIG. 3 is a plan view of a second mat-like fiber-carrying substrate according to a second embodiment of the invention;

FIG. 4 is a perspective view of the mat-like fiber-carrying substrate of FIG. 3;

FIG. 5 is a plan view of a third fiber-carrying mat-like substrate according to a third embodiment of the invention;

FIG. 6 is a perspective view of the third fiber-carrying mat-like substrate of FIG. 5;

FIG. 7 is a plan view of a fourth fiber-carrying mat-like substrate according a fourth embodiment of the invention;

FIG. 8 is a perspective view of the fiber-carrying mat-like substrate of FIG. 7;

FIGS. 21 and 22 are diagrams illustrating how the fiber spacing across the mat may be altered to obtain spatial resolution modulation across the area of the sensing mat;

FIGS. 34 and 35 are diagrams illustrating the operation of the embodiments of any of FIGS. 28 to 31.

DESCRIPTION OF THE EMBODIMENTS

Figure 1:
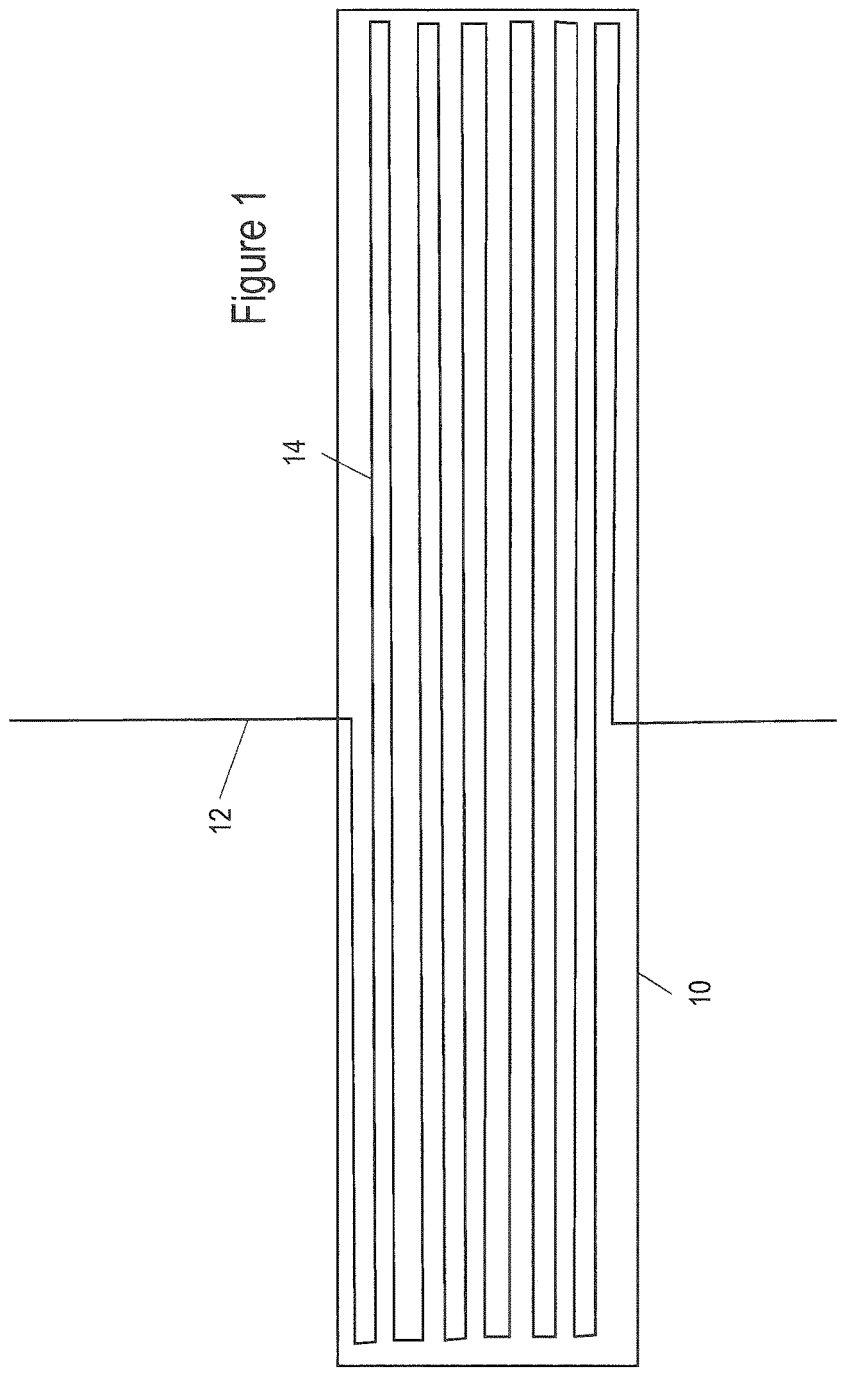
FIG. 1 is a diagram of a first mat-like fiber-carrying substrate according to a first embodiment of the invention.
Figure 2:
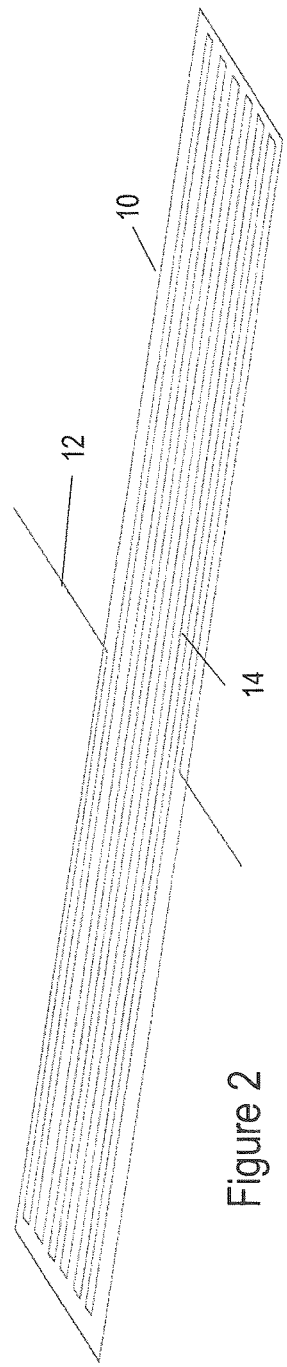
FIG. 2 is a perspective view of the mat-like fiber-carrying substrate of FIG. 1.

In overview, embodiments of the invention provide a flexible mat-like substrate upon or within which is mounted one or more lengths of optical fiber extending (usually) in reciprocating back and forth patterns within or on the substrate, so as to give a high fiber density, in terms of length of fiber per unit area. For example, the optical fiber may be mounted on or in the substrate so as to loop backwards and forwards from side to side on the substrate for example horizontally, vertically, or obliquely, such as, for example, diagonally extending backwards and forwards across the surface or within the substrate. The purpose of the reciprocating nature of the length of fiber across the substrate is to increase the fiber density per unit area on the substrate such that when the substrate is connected to a distributed acoustic sensing system, the substrate having the fiber mounted thereon or therein provides an area of high sensing resolution, for example for use in eddy tracking or the like. The flexible nature of the substrate and the fiber mounted thereon or therein means that the substrate may be wrapped around objects to be monitored very easily.

Moreover, in various embodiments of the invention additional features are present so as to enhance the operation of the mat. For example, in some embodiments the lengths of fiber across the mat are connected together at the ends in such a manner so as to reduce bending losses. For example, the connections may be made by loops of fiber that are large enough to minimise bending losses, or the connections may be made by specialist fiber joining devices such as the MiniBend™ optical fiber connector, available from AFL, of Duncan, S.C., USA. In this latter case, a 180 degree bend can be achieved with a 1 mm fiber bend diameter, and hence the lengths of fiber can be placed close together in a high density configuration.

In a further arrangement contiguous lengths of fiber in the mat are not connected to each other end to end, but instead a length of fiber is connected to another length of fiber some distance away, for example with 1, 2, 3, 4 or more other lengths of fiber therebetween. In this way the connection lengths are not forced to bend too sharply, and hence bending losses can be reduced.

In further embodiments the two dimensional arrangement of fiber across the mat may be modulated so as to give desired spatial resolution characteristics. For example, the spacing between alternating lengths of fiber may alter, for example in accordance with a mathematical function such as a monotonic function. In other examples, the mat may be provided with a plurality of areas where the fiber is laid in alternating rows of different pitch or density, such that different spatial resolutions are obtained in the different areas. In further embodiments different patterns of spiral may be laid across the map, for example looping patterns, or spiral patterns. A spiral pattern is particularly attractive where the mat is to function as an "acoustic lens", highly sensitive to sound coming from the direction normal to the plane of the center of the spiral. The spiral may be a linear spiral or a logarithmic spiral.

Additional embodiments provide multiple layers of fiber one on top of the other, where preferably the fibers are offset from layer to layer. Again this can increase spatial sensing resolution, and also provide for increased sensitivity using diversity processing techniques.

In further embodiments the characteristics of the mat may be modulated across the mat, again to aid sensing. For example, stiffer or harder areas may be provided in the mat, to increase acoustic conductance in those regions and thereby alter the fiber response in those regions. The areas may be provided in a determinative pattern across the mat, to provide "sensing points" at which better acoustic coupling into the fiber is provided. The sensing points may be arranged in rows along the lengths of fiber installed on the mat, and the position of the sensing points (i.e. the hardened and/or stiffened areas) may be staggered from row to row of fiber.

Embodiments of the invention therefore provide for extremely easy installation and removal of high density lengths of fiber for structure monitoring purposes. Advantageously, the flexible mat-like substrate provided with the reciprocating lengths of fiber mounted thereon when used with a distributed acoustic sensor system allows for quick and accurate eddy tracking within fluid carrying structures such as pipes or the like, for flow monitoring purposes.

Several embodiments of the invention will now be described in detail.

FIG. 1 illustrates a first embodiment of the invention, wherein a flexible mat-like substrate 10 is provided having a rectangular shape with two parallel long sides, and two shorter sides. An optical fiber 12 is also provided, which intercepts the flexible mat-like substrate 10 substantially in the middle of one of the long sides thereof, and then extends in a reciprocating fashion from side to side parallel with the long sides, extending substantially parallel to the length of each long side of the mat so as to form several lengths of fiber extending from one short side of the rectangular mat 10 to the other short in reciprocating fashion across the plane area of the mat, as shown by fiber 14. Note that the fiber 14 extends from side to side in reciprocating fashion as one single length i.e. at each end of each reciprocating length the fiber is turned through approximately 180° about an area complying with the fiber's allowable bend radius so as to minimise losses, so that the fiber then extends back in the opposite direction across the flexible mat-like substrate 10. In this manner several reciprocating lengths backwards and forwards extending across the plane of the flexible mat-like substrate can be formed.

With respect to the material of the flexible mat-like substrate, this may be a knitted or woven material, or may be formed from a fibrous or extruded material. The main characteristic is that it should be flexible to the same extent as the fiber, and be capable of having the fiber mounted or woven therein, or otherwise affixed thereto or therein.

In use, as will be described in further detail later, the flexible mat-like substrate 10 may be wrapped around an object to be monitored and fastened in place via clamps or the like placed around the outer surface of the flexible mat-like substrate, so as to hold the substrate in place against the object. The optical fiber 12 may be connected to an optical fiber distributed acoustic sensing system, such as the iDAS™ system referenced previously, to allow for distributed acoustic sensing to be formed across the area of the flexible mat-like substrate 10. The flexible mat-like substrate 10 may therefore be used, via the distributed acoustic sensing system, for eddy tracking or other flow monitoring purposes in the pipe or structure around which the substrate is wrapped.

FIGS. 3 and 4 illustrate a second embodiment 20 of the present invention. Here, a flexible mat-like substrate 20 is provided, which is again rectangular in shape, with two parallel long sides, and two parallel short sides. In this embodiment, the optical fiber 22 is incident on the flexible mat-like substrate 20 at one end of the rectangular shape, and the fiber extends parallel to the short sides reciprocating backwards and forwards extending along the length of the mat-like substrate. The fiber then exits the mat-like substrate at the opposite end of the mat-like substrate to where it entered, leaving in a direction parallel to the short sides thereof. Of course, whilst the fiber is shown entering and leaving the mat in directions parallel to the short sides of the rectangle, the fiber may, in variants of this embodiment, enter and/or leave the mat at any angle, such as, for example, parallel to the long sides of the rectangle, or at oblique angles in between those shown. The second embodiment therefore provides an alternative fiber distribution across the mat, which distribution may be more suitable for some applications. In all other respects, however, the second embodiment is the same as the first embodiment.

FIGS. 5 and 6 illustrate a third embodiment of the invention. Here a flexible mat-like substrate 30 is provided, which again is slightly rectangular in shape, although to a lesser extent than the previous embodiments, and in some variants of this embodiment the mat might, for example, be of equal length sides i.e. square. Again, here an optical fiber 32 is incident upon one edge of the flexible mat-like substrate 30, and the fiber is mounted extended in a reciprocating fashion from side to side across the substrate as shown by loops 34. In this embodiment, the fiber then exits the substrate at the same side as it entered. In various other embodiments, however, the fiber might exit in a different direction, for example either in the opposite direction, or at angles normal or oblique thereto.

Considering the third embodiment in combination with the first and second embodiments, it should therefore be understood that the flexible mat can take almost any shape desired, including square, rectangular, although other shapes, such as oval, round, or any polygonal or other shape may be used, as required.

FIG. 7 illustrates a fourth embodiment, wherein a rectangular flexible mat-like substrate 40 is provided, having optical fiber 42 mounted thereon in reciprocating lengths 44 extending across the width of the mat, as shown. In this embodiment the optical fiber enters the mat near one of the corners on a short side thereof, and then extends in long lengths backwards and forwards in reciprocating fashion across the rectangular mat substantially parallel to the long sides of the mat, exiting the mat at the opposite short side, extending in a direction extending away from the flexible mat-like substrate 40. In this respect, the aspect ratio of the rectangular flexible mat-like substrate 40 is such that the long sides of the rectangle are significantly, for example at least four times, and preferably at least six times, and even more preferably at least ten times longer than the short sides of the rectangle, such that a long, thin structure is obtained. The reciprocating lengths of cable run along the mat substantially parallel to the long sides of the rectangle, such that a "ribbon-cable" flexible mat-like structure is obtained. As will be described later in FIGS. 15 and 16, such a "ribbon-cable" type mat-like structure allows high resolution monitoring to be undertaken along a significant length of a pipe-like structure.

Figure 9:
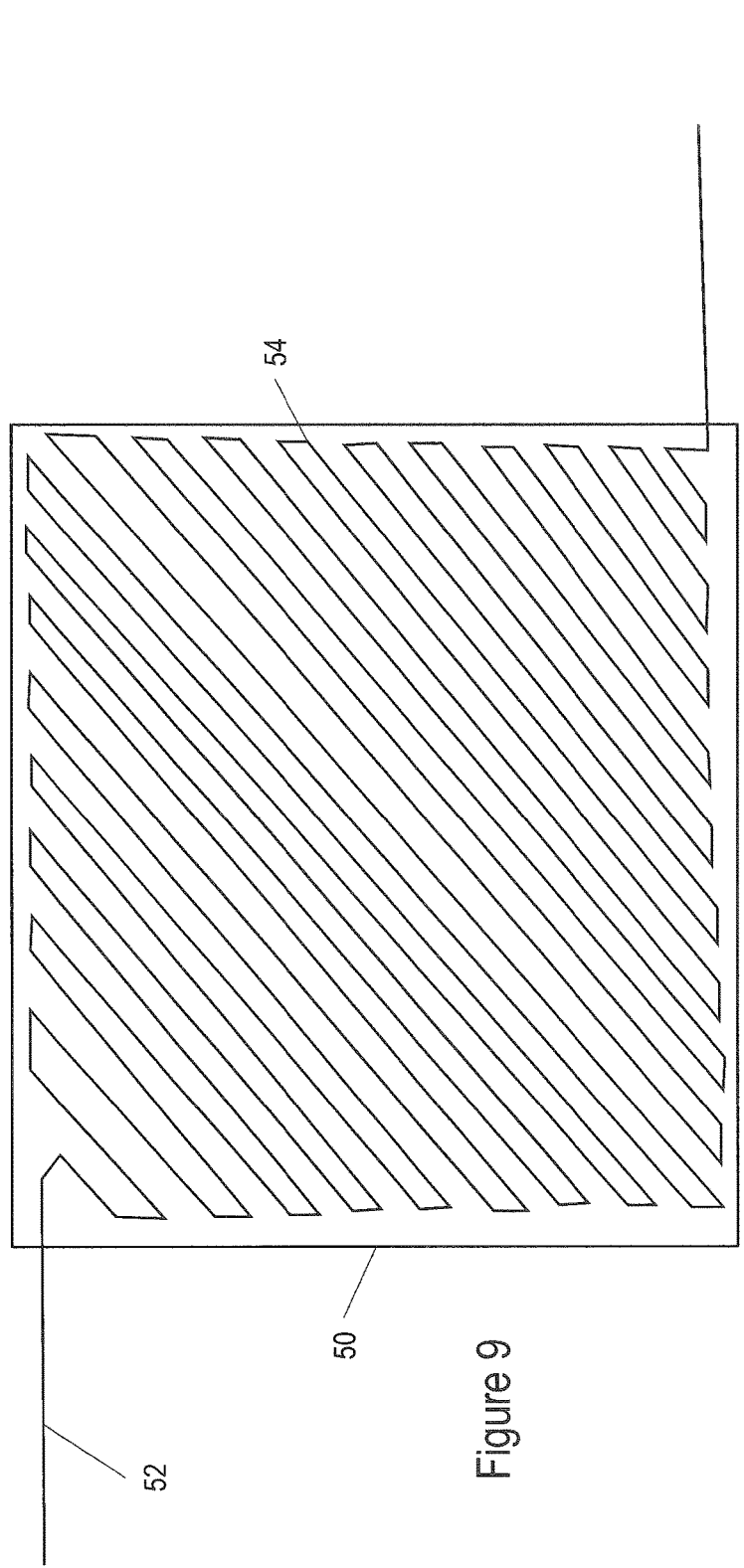
FIG. 9 is a plan view of a fifth fiber-carrying mat-like substrate according to a fifth embodiment of the invention.
Figure 10:
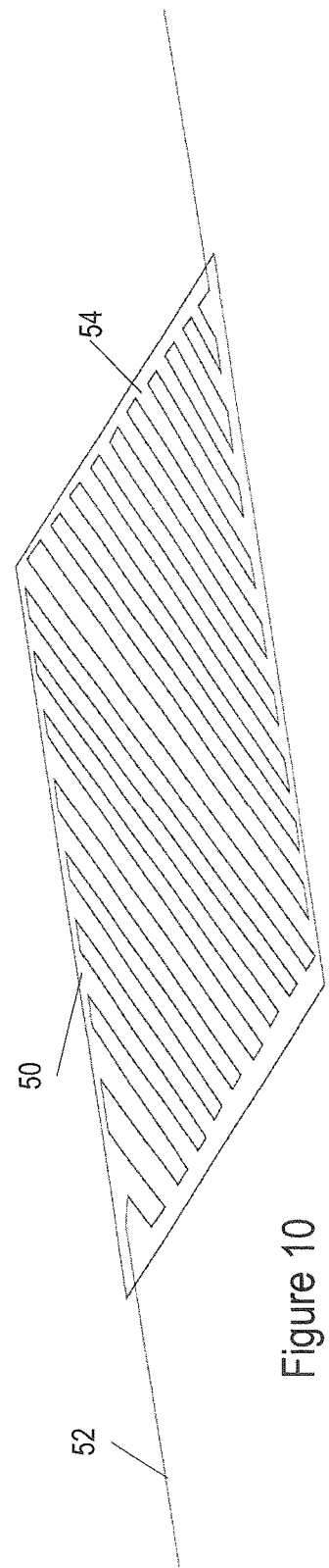
FIG. 10 is a perspective view of the fiber-carrying mat-like substrate of FIG. 9.

FIG. 9 illustrates a fifth embodiment. Here a substantially square flexible mat-like substrate 50 is provided, having an optical fiber 52 incident at one side thereof, which extends this time in an oblique reciprocating fashion substantially diagonally across the flexible substrate extending from one side to an adjacent side, and then turning and extending in an opposite direction across the flexible mat-like substrate. As will be apparent from the fifth embodiment, when taken in conjunction with the first to fourth embodiments described previously, the shape of the mat, and the arrangement of the fiber on its surface, or within the substrate itself, is highly variable, although arrangements that provide for a high density of fiber per unit area are preferred. In this respect, we have found that reciprocating lengths of fiber across a substrate can easily provide such high densities in a straightforward fashion. However, other patterns, for example spiral patterns, or even overlapping checker-board type patterns may be used. Preferably however, patterns where the fiber does not overlap are preferred, to allow for ease of processing of the data obtained later.

Figure 11:
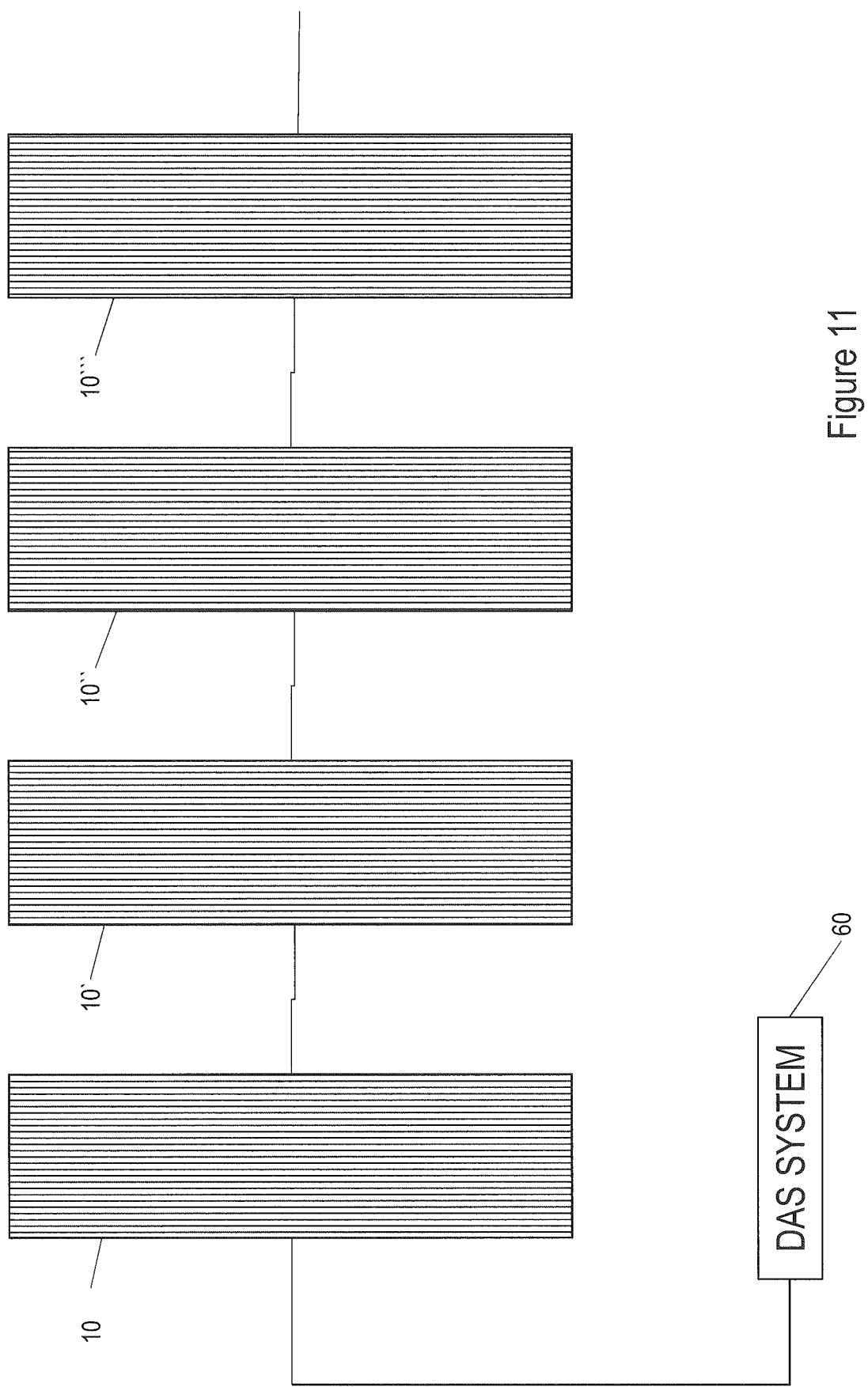
FIG. 11 is a diagram illustrating how plural fiber-carrying mat-like substrates may be connected in series with a distributed acoustic sensor (DAS) system.

Turning to FIG. 11, FIG. 11 illustrates a series of the flexible mat-like structures 10, 10', 10", and 10'", connected in series with each other, and then connected to a DAS system, such as the Silixa iDAS™. Such an arrangement allows for several of the flexible mat-like structures to be deployed along a pipe or other structure to be monitored, and for a single DAS system 60 to monitor each of the flexible mat-like structures. Preferably, the plural flexible mat-like structures are formed from a single length of fiber, to avoid the need for splicing individual flexible mat-like structures together when in the field. Alternatively, groups of flexible mat-like structures, for example two or three units may be formed from a single length of fiber, which may then be connected in series with other groups, to thereby reduce the amount of fiber splicing that is required. In addition, whilst the arrangement of FIG. 11 shows that each of the mats in the series is identical, in other embodiments this need not be the case, and different shape mats, for example with different fiber configurations thereon may be combined together in series as required. The purpose of combining several of the flexible mat-like structures together in series connected to a single DAS system is to allow for multiple high resolution monitoring areas to be provided, to allow for monitoring of different areas along a pipe or structure to be monitored. An example is shown in FIG. 12.

Figure 12:
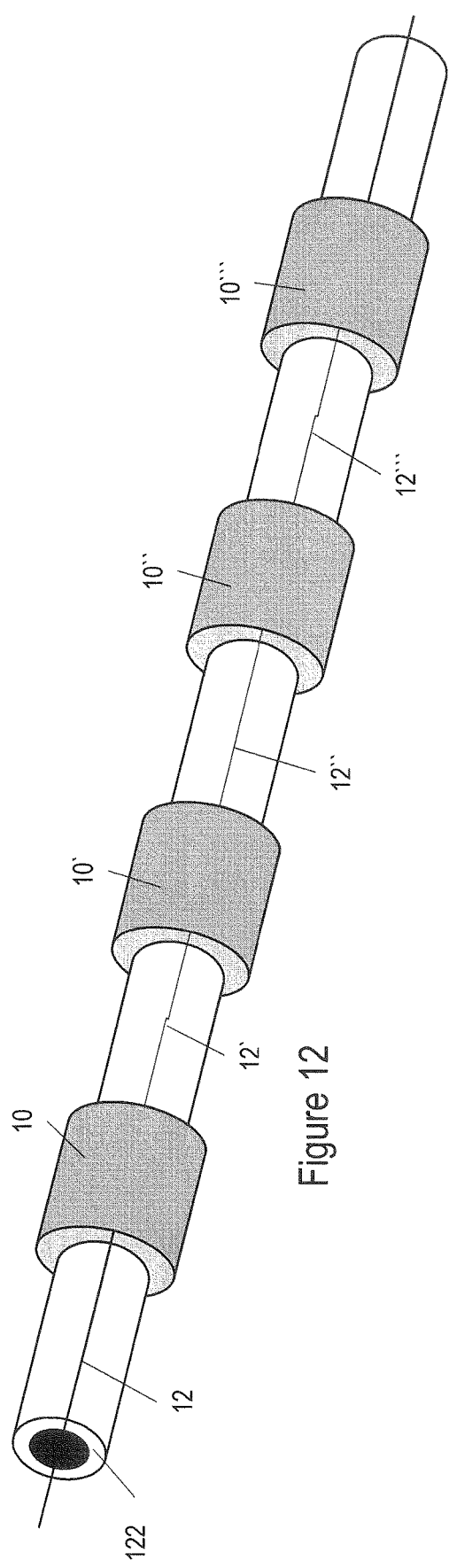
FIG. 12 is a perspective view illustrating the deployment of the arrangement of FIG. 11 around a pipe in use.
Figure 13:
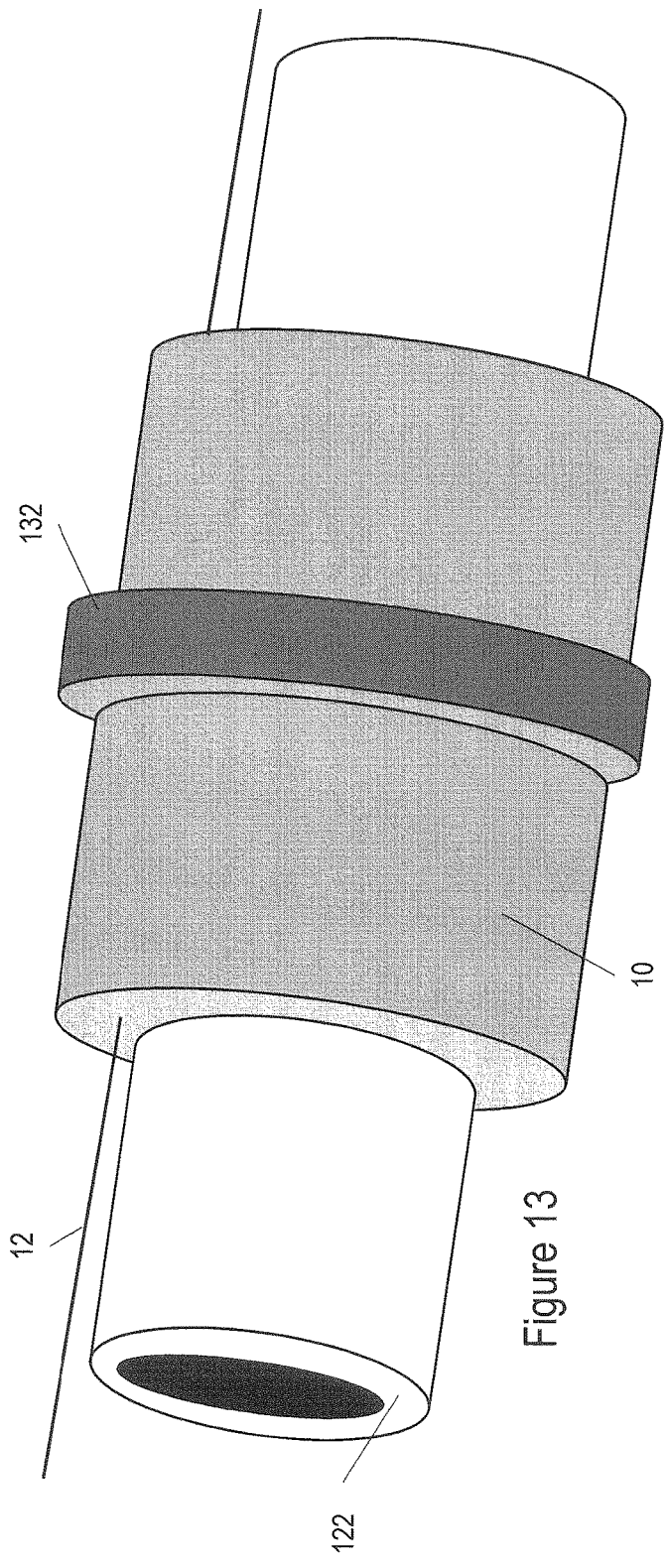
FIG. 13 is a magnified view of a fiber-carrying mat-like substrate of FIG. 12 illustrating how it is fastened around a pipe.

Turning to FIG. 12, here four flexible mat-like structures 10, 10', 10", and 10'", each corresponding to the first embodiment of the invention described previously, are connected together in series via optical fiber sections 12, 12', 12", and 12'41 . Each flexible mat-like structure 10 is wrapped around a pipe 122 to be monitored, such that it extends around the whole or a majority of the circumference of the pipe. As shown in FIG. 13, a flexible mat-like structure 10 is held in place by a band clamp 132 or the like extending around the outer surface of the flexible mat-like structure 10. The plural flexible mat-like structures 10, 10', 10", and 10'" etc. provide for multiple monitoring areas along the pipe where high spatial resolution monitoring can be obtained. Thus, for example, flow monitoring can be achieved at several sections along the pipe, coincident with the locations of the flexible mat-like structures.

The effect of installing a flexible mat-like structure around the pipe is to effectively provide a high density of optical fiber around the pipe, to provide for high spatial sensing resolution in that area. As described previously, this effect was obtained in the prior art by helically wrapping fiber around a pipe. With the flexible mat-like structure of the present invention, however, the high density of fiber is obtained by simply wrapping the flexible mat-like structure around the pipe, which is significantly quicker and easier to implement than helically wrapping fiber around the pipe. Moreover, the flexible mat-like structure can be easily removed from the pipe simply by removing the clamp, and unfolding the mat-like structure from around the pipe. The mat-like structure or structures can then be re-used and deployed again. In contrast, in the prior art, removing helically wrapped fiber from about a pipe was time consuming and usually not feasible. Cutting helically wrapped fiber from the pipe would have been possible, but meant that the lengths of fiber would not have been economically reusable. The embodiments of the present invention therefore provide for significant economic and technical advantages in terms of ease of installation and removal, and are reusable.

Figure 16:
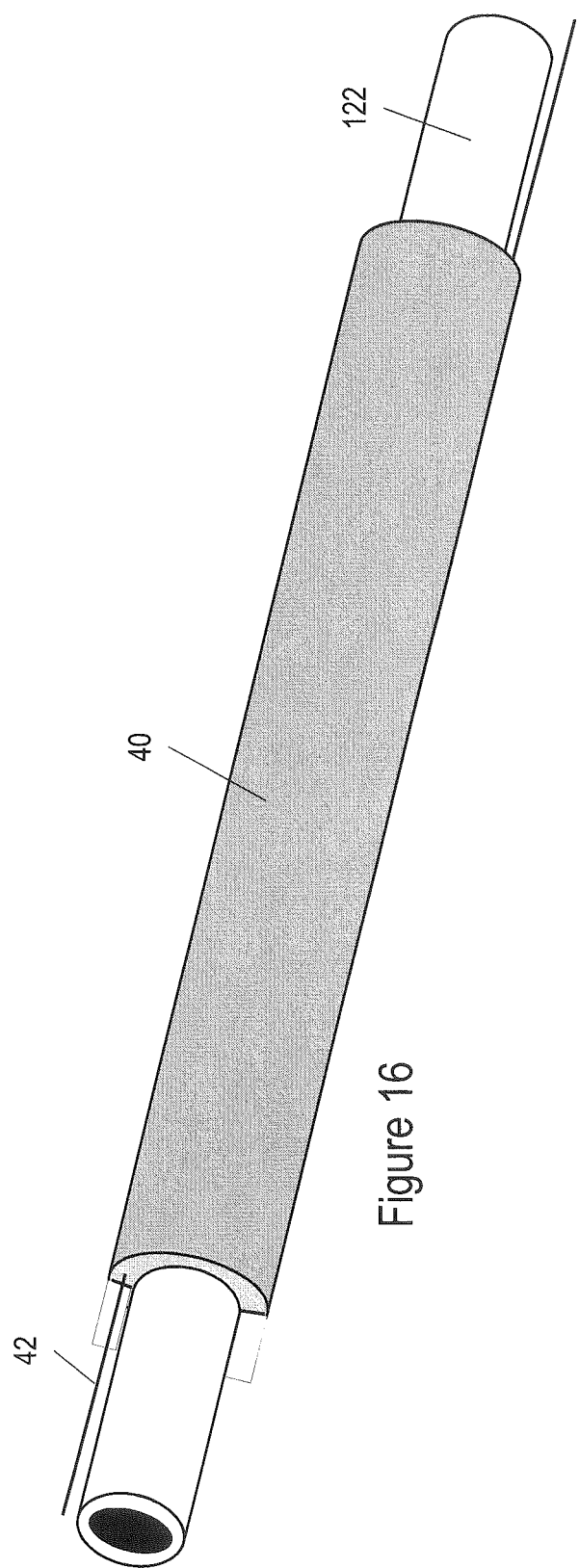
FIG. 16 is a perspective view of a further embodiment of the invention wherein the ribbon-like fourth embodiment of the present invention is wrapped around a pipe.
Figure 17:
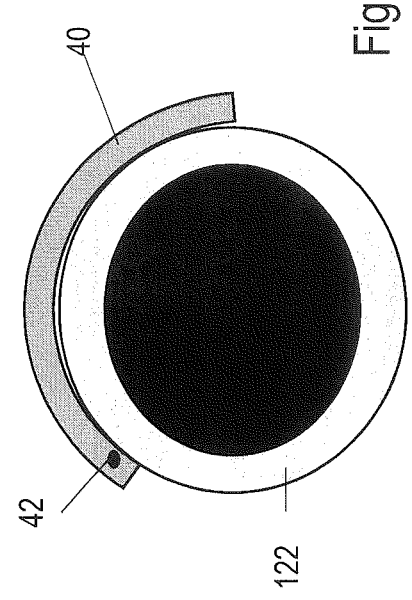
FIG. 17 is a side end-on view of the pipe of FIG. 15, illustrating the flexible mat-like substrate extending at least partially around the outer surface of the pipe.

FIGS. 16 and 17 illustrate a further example of the installation of a flexible mat-like structure in the field, this time using the "ribbon-cable" type embodiment of FIGS. 7 and 8. Here, the flexible mat-like structure 40, which has a high length to width aspect ratio of 4 or more, 6 or more, or even 10 or more, for example, is mounted against the pipe 122 substantially longitudinally arranged parallel thereto, and extends partially around the pipe, as shown in FIG. 17. The flexible mat-like structure 40 would typically be held in place by a plurality of clamps at positions along its length, which are not shown. The longitudinally extending mat-like structure 40 provides for monitoring of the pipe 122 along a significantly long length thereof, depending upon the length of the mat-like structure 40. In this way, eddys or other noise or sounds may be tracked at high spatial resolution along a longer length of pipe than with the other embodiments.

Whilst FIG. 16 shows a single flexible mat-like structure 40, it will of course be understood that plural such structures may be connected together in series, in the same manner as described previously with respect to FIG. 11.

Figure 14:
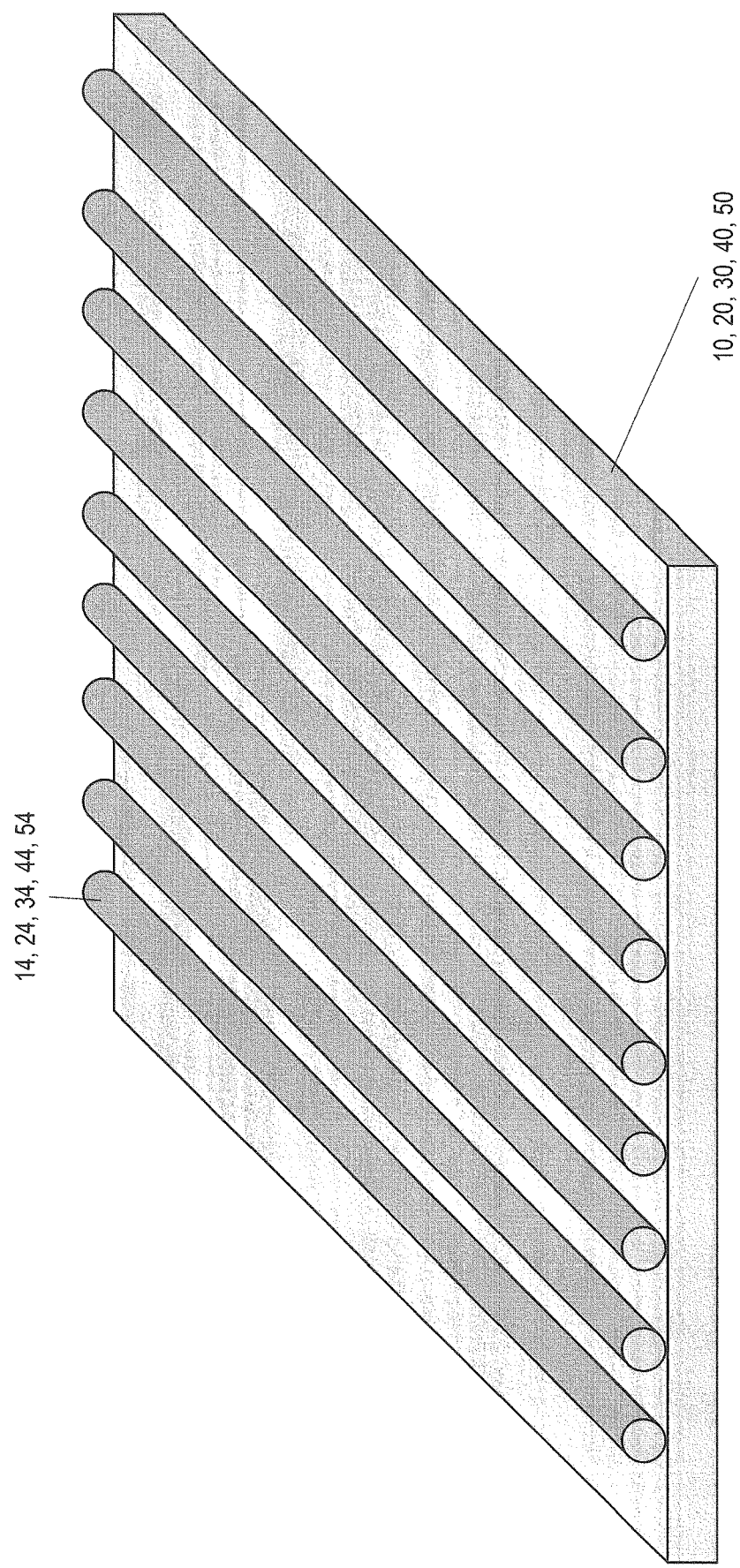
FIG. 14 is a diagram illustrating one technique for mounting the fiber on the flexible substrate.
Figure 15:
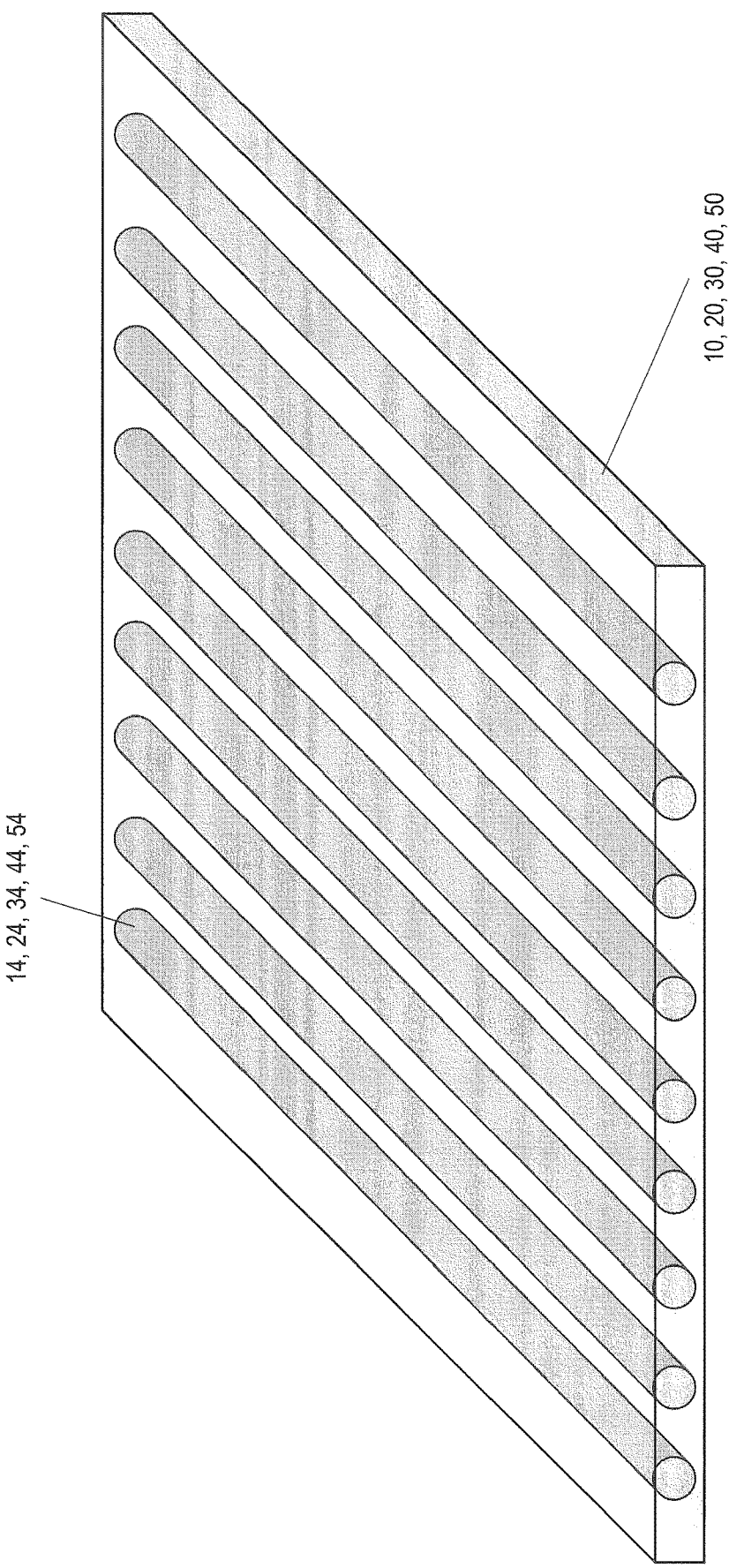
FIG. 15 is a diagram illustrating a second technique for mounting the fiber within the flexible substrate.

With respect to how the optical fiber is mounted on or within the flexible substrate, several options are available, on which can also depend upon the material of which the flexible substrate is made. FIG. 14 illustrates one such option, wherein the lengths of fiber are mounted on top of the substrate, for example by being glued thereto or the like. This option may be more appropriate when it is not possible to mount the fiber within the substrate itself, for example where an extruded or other high density substrate has been used. An alternative, which may, for example, be used with knitted or woven substrates, or substrates made from compressed fibers, is to thread or weave the optical fiber into the body of the substrate itself, as shown in FIG. 15. This may have advantages in terms of keeping the optical fiber securely fixed within the substrate, and maintaining the relative spatial orientation and relationship between the different lengths of fiber in the substrate. As noted, this option can be used part when a knitted or woven material type substrate is used.

This provides for high spatial resolution monitoring of structures using an optical fiber sensor such as a distributed acoustic sensor or the like. Of course, the flexible mat-like substrates having optical fiber mounted thereon or therein may also be used with other optical fiber sensors, such as distributed temperature sensors or the like. The main advantages of embodiments of the invention is the easy installation of the fiber when in the field, as well as the ability to remove the installed flexible mat-like structures for re-use and redeployment.

Figure 19:
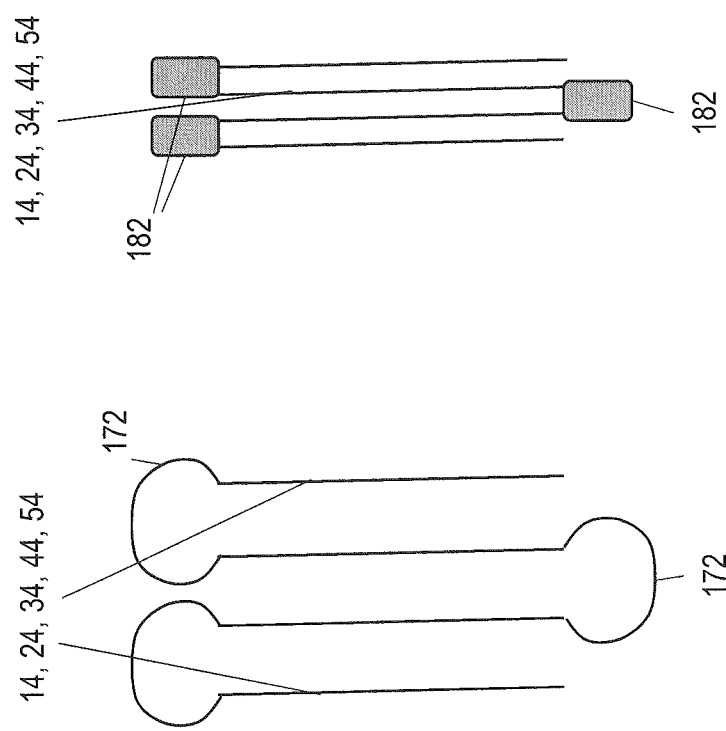
FIG. 19 is a diagram illustrating how optical fiber Mini-Bend™ type devices may be used to connect the ends of straight sections of fiber in embodiments of the invention.
Figure 18:
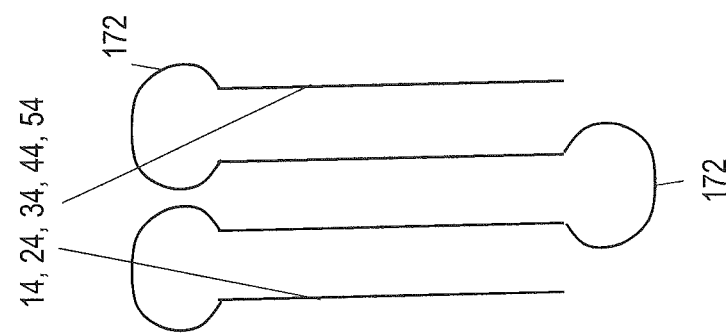
FIG. 18 is a diagram illustrating how loops may be used to connect the ends of straight sections of fiber in embodiments of the invention.

FIGS. 17, 18, and 19 show different techniques for connecting the ends of straight runs of fiber across the mat so as to minimise bending losses as the fiber lengths reciprocate from side to side across the mat. FIG. 17 provides a first solution to this issue, which is to provide a loop of fiber 172 which is sufficiently long so as to meet any bending radius requirements of the fiber so as not to incur losses. The size of the connecting loops 172 will depend upon the precise specifications of the optical fiber that is being used, with bend insensitive fiber typically resulting in smaller size loops than conventional fiber. It will be understood, therefore, that the precise dimensions of loop 172 will depend upon the acceptable low-loss or no-loss bend ratio of the fiber used, with the idea being that the loops 172 are sufficiently large and with suitable bend radii so as to allow the fiber to be bent between the reciprocating lengths 14, 24, 34, 44, and 54 so as to obtain no losses from the bend. Typical minimum bend radii of 8-15 mm are readily available.

FIG. 18 illustrates an alternative technique for connecting the ends of the reciprocating lengths of fiber 14, 24, 34, 44, and 54. In the embodiment of FIG. 18 a component known as a "mini bend" 182 is used to connect the reciprocating lengths of fiber. The mini bend is a proprietary component available from AFL of Duncan, S.C., USA that allows for a single strand of multi-mode or single mode fiber to be formed with a 180 degree bend with a 1mm fiber bend diameter. In the context of the present embodiments, therefore, the reciprocating lengths of fiber 14, 24, 34, 44, and 54 can be formed with mini bends at each end of each reciprocating length so as to allow for a very tight 180 degree turn in the fiber. This allows the reciprocating lengths to be located on the mat significantly closer together without requiring large turning loops, such as the loops 172 of the embodiment of FIG. 17. A more compact reciprocating arrangement can therefore be obtained, which provides for greater spatial resolution in a more compact mat arrangement.

A third solution to the problem of fiber loss at bends when turning through 180 degrees from one reciprocating length to another is shown in FIG. 19. Here, rather than each continuous reciprocating length being connected together consecutively as in FIG. 17, the continuous reciprocating lengths of fiber 14, 24, 34, 44, and 54 are connected together non-consecutively, such that a particular reciprocating length of fiber is connected at its end to another reciprocating length of fiber that is 2, 3, or 4 positions away from the particular reciprocating length, in the parallel array of reciprocating lengths. Thus, as will be seen in FIG. 19, connecting loops 192 are provided which connect particular reciprocating lengths of fiber 14, 24, 34, 44, and 54 with another reciprocating length that is located either two or three lengths away in the array of reciprocating lengths. This connection continues until the end of the array of reciprocating lengths is reached, and then the connection pattern doubles back on itself to travel back up the array in the opposite direction, connecting reciprocating lengths that are two or three positions away in the array, until the opposite end of the array of reciprocating parallel lengths is reached, whereupon the connection direction reverses direction and carries on back along the array connecting lengths that are two or three lengths away from each other together. What this means is that contiguous parallel reciprocating lengths of fiber in the particular array across the mat are not actually connected together consecutively along the length of the fiber and in fact there may be several meters of fiber between any pair of contiguous reciprocating lengths that are next to each other. However, by connecting the ends of reciprocating lengths of fiber together in this way, the bend characteristics of the fiber may be maintained so as to reduce bending losses. The resulting precise arrangement of the consecutive locations of each reciprocating length along the fiber due to this connection technique can then be taken account of in the processing performed in the distributed acoustic sensor apparatus to which the fiber is connected.

FIGS. 17, 18, and 19 therefore give three different techniques by which the ends of the reciprocating lengths of fiber going across a mat or along a mat can be connected together, so as to reduce bending losses in the fiber due to the turn from one reciprocating length to another. Each technique provides its own advantages and disadvantages, as described.

Figure 20:
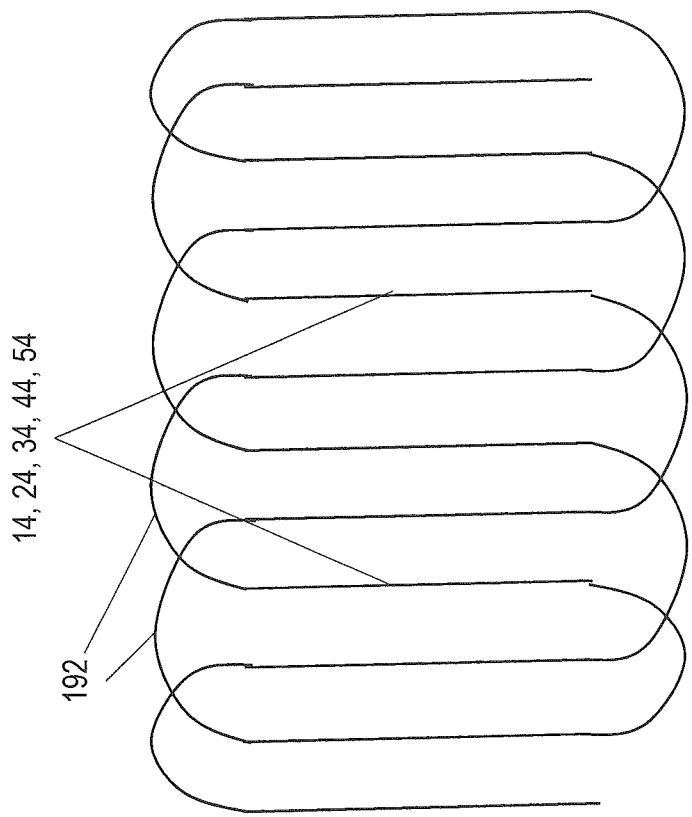
FIG. 20 is a diagram illustrating that non contiguous lengths of fiber may be connected by fiber loops so as to be sequential in some embodiments of the invention.

FIGS. 20 and 21 show embodiments which illustrate how the pitch of the reciprocating lengths of fiber may be altered along a mat, so as to provide different spatial sensing resolutions at different portions of the mat. For example, in FIG. 20 a length of fiber 64 is shown mounted on a mat 10, 20, 30, 40, or 50, and which reciprocates from side to side across the mat, but with a change in pitch width W, as shown in FIG. 21, between each reciprocation. In particular, in the embodiments shown in FIG. 21 the pitch width W between each reciprocating length of fiber increases from length to length. This increase may be in accordance with a known mathematical function, such as a monotonic function, a trigonometric function, a logarithmic function, an exponential function, or a hyperbolic function, as shown. Any other function may however be used, and different functions to define the pitch width W may be used in different sections of the mat. FIG. 22 illustrates an arrangement where the pitch width Walters between two different values in different regions of the mat. In particular, in the region A the pitch width W is much smaller, resulting in a higher frequency of reciprocation of the fibres across the mat. In contrast, in region B the pitch width W is larger, resulting in a lower degree of reciprocation of the fiber across the mat. In this respect, this acts to modulate the spatial sensing resolution of any distributed acoustic sensor connected to the fiber 74 in the regions A and B, in that the spatial sensing resolution in the region A will be higher, due to the greater length of fiber in the region, due to the greater number of reciprocations back and forth across the flexible mat. In contrast, in region B the spatial sensing resolution will be lower, as due to the greater pitch width there are a lower number of reciprocating lengths of fiber reciprocating backwards and forwards across the mat, such that the total length of fiber per unit area is lower in region B than in region A, and hence a lower spatial sensing resolution will be achieved.

Generally, the spatial sensing resolution can be tuned across the area of the mat by arranging the fiber on the mat with a higher or lower density, as required. For example, where a higher spatial sensing resolution is required in a particular area of the mat, then a higher density of fiber per unit area, in terms of the length of fiber laid in that area is required, than for an area of the mat where a lower spatial sensing resolution is required. By arranging the fiber layout across the mat to give areas of high fiber density i.e. more length of fiber within the particular area, and areas of lower fiber density i.e. areas with a lower total length of fiber within an area, then the spatial sensing resolution of the distributed acoustic sensor and flexible mat system as a whole can be spatially tuned to give the desired spatial sensing resolution in each sensing area.

FIG. 22 illustrates a further embodiment of the flexible mat 10, 20, 30, 40, or 50 of embodiments of the invention. Here, the lengths of fiber 14, 24, 34, 44, and 54 are mounted on top of the main plane or body of the mat so as to stand off the main plane or body, and are protected on the mat by protrusions 222 within which the lengths of fiber 14, 24, 34, 44, and 54 are provided so as to run therein. Within the embodiment of FIG. 22 it will be seen that the protrusions 222 are arranged substantially in alignment in parallel running backwards and forwards across the mat, although of course in other embodiments this need not be the case, and the protrusions 222 can be formed so as to match whatever distribution pattern of fiber across the mat is required. For example, the protrusions 222 could match either of the fiber arrangements described in FIGS. 21 and 22 described previously, or any other more complicated fiber arrangement, such as a looping or spiral arrangement, as required.

The advantage of providing the protrusions 222 with the fiber 14, 24, 34, 44, and 54 provided therein is that it is believed that the protrusions 222 will provide better more discrete points of contact of the whole mat arrangement against the vessel, pipe, or other surface which is to be monitored. That is, in use, typically the mat will be wrapped around the pipe, vessel, or other surface to be monitored such that the upper surfaces of the protrusions 222 contact the vessel, pipe or surface to be monitored with the planar surface 10, 20, 30, or 40 then located external to the monitored vessel, pipe, or surface. In effect, therefore, the protrusions 222 including the fibres therein will be sandwiched between the planar surface 10, 20, 30, 40, 50 of the flexible mat, and the pipe, vessel, or other surface to be monitored. The upper surfaces of the protrusions 222 then provide discrete acoustic conduction regions between the pipe, vessel, or other surface to be monitored and the sensing fibres 14, 24, 34, 44, 54 embedded therein.

Figure 23:
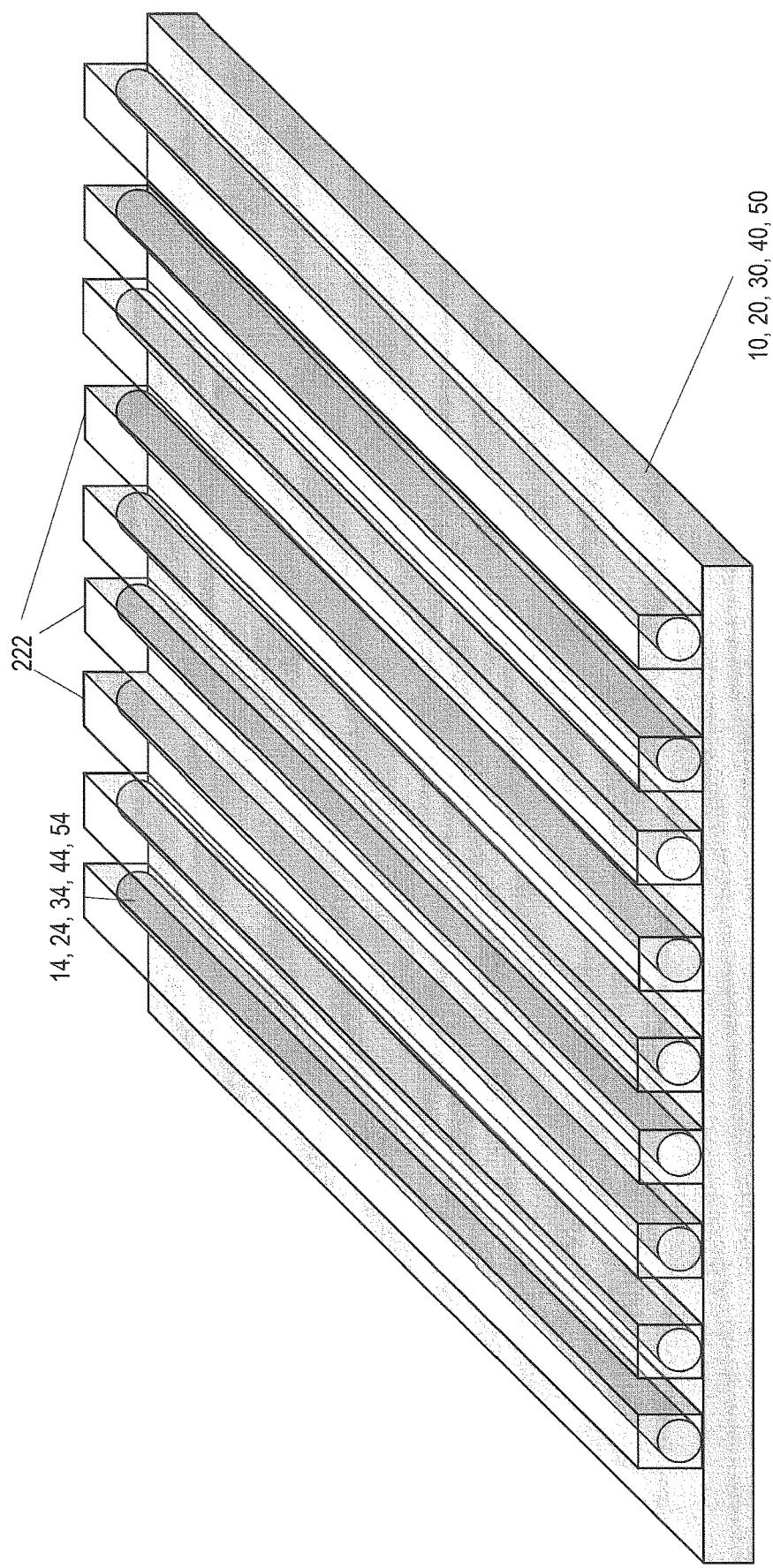
FIG. 23 is a diagram of a further embodiment of the invention where the fiber is encased on the surface of the mat.
Figure 24:
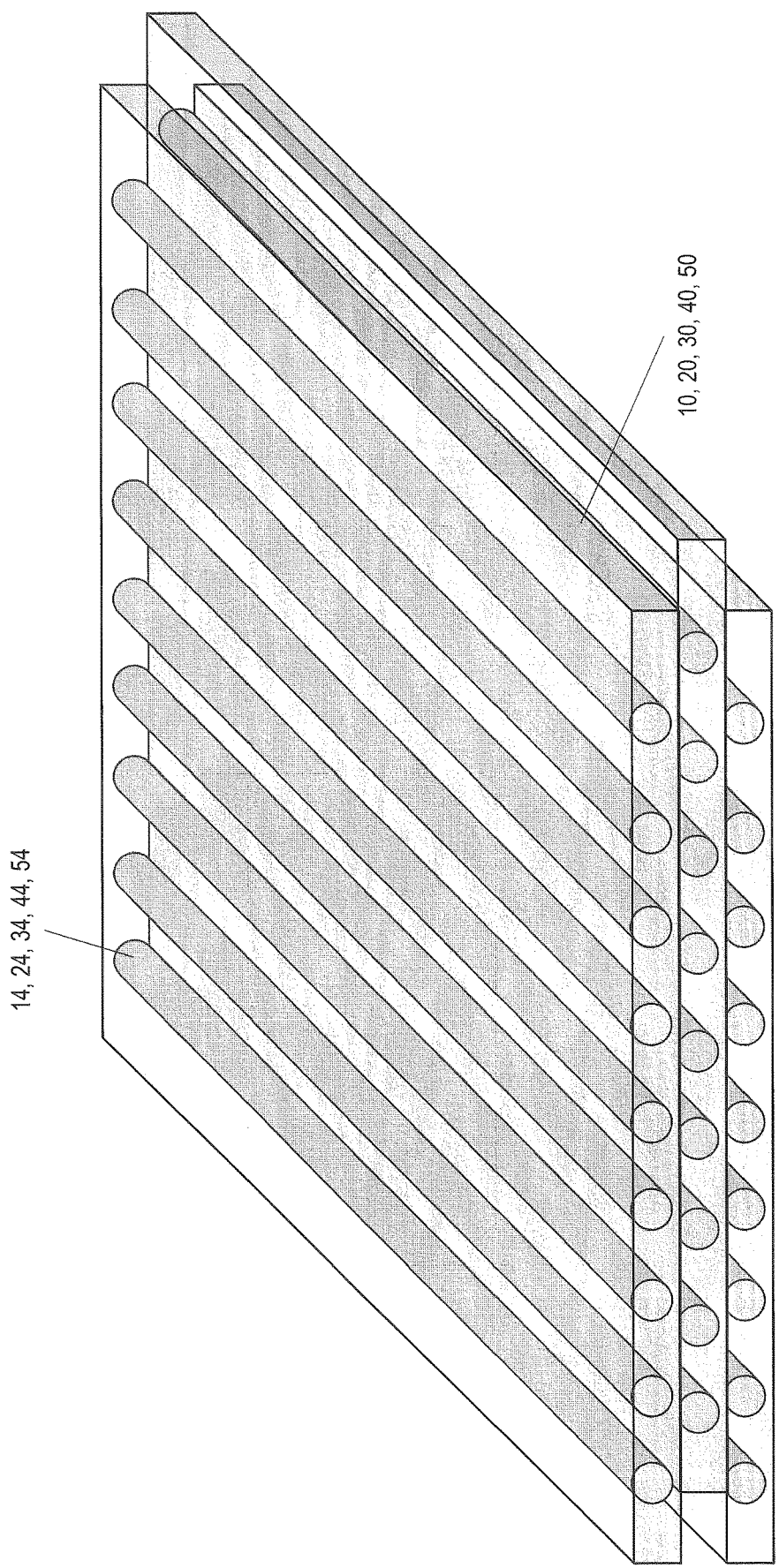
FIGS. 24 and 25 are diagrams of multi-layer mat arrangements according to embodiments of the invention.

FIGS. 23 and 24 show further embodiments of the invention, wherein multiple layers of fiber are provided placed one on top of the other so as to provide, for any particular surface area of the mat, a greater density of fiber per unit surface area, so as to provide for even further enhanced spatial sensing resolution. Within FIG. 23 multiple individual layers 10, 20, 30, 40, and 50 are provided as described, for example, with respect to FIG. 14 previously. The layers are then arranged one on top of the other as shown, with the individual reciprocating lengths of fiber from each layer interdigitated therebetween from layer to layer, so as to provide for increased sensing resolution. FIG. 24 shows a further variant of this embodiment, using the embodiment described previously with respect to FIG. 22, wherein the fiber is laid over the planar surface of the mat on top thereof, contained within raised portions thereof. Again, in the embodiment of FIG. 4 the layers of fiber are offset with respect to each other, such that the reciprocating rows of fiber are interdigitated one between the other, to provide for increased spatial sensing resolution.

Figure 25:
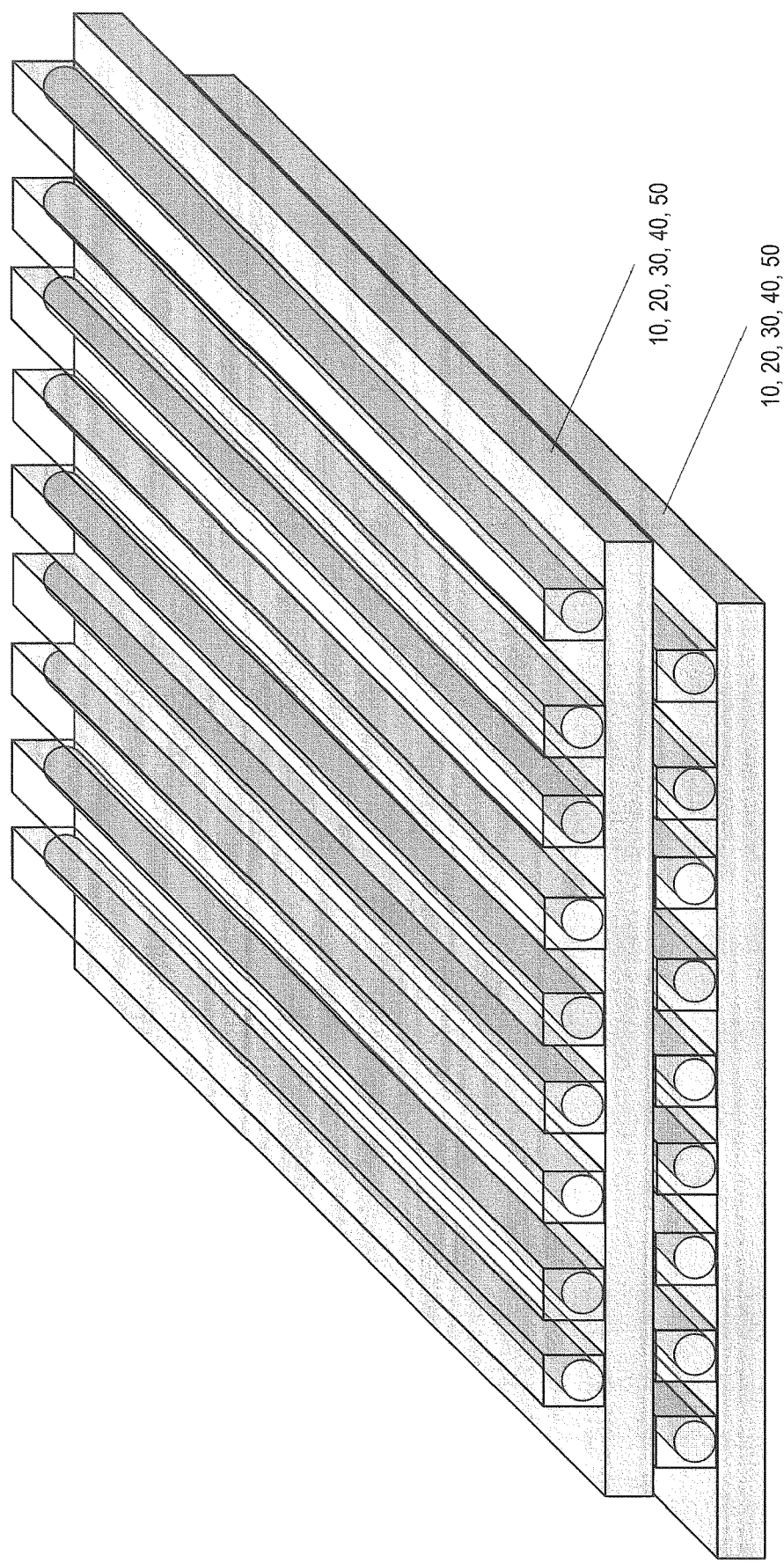
Figure 26:
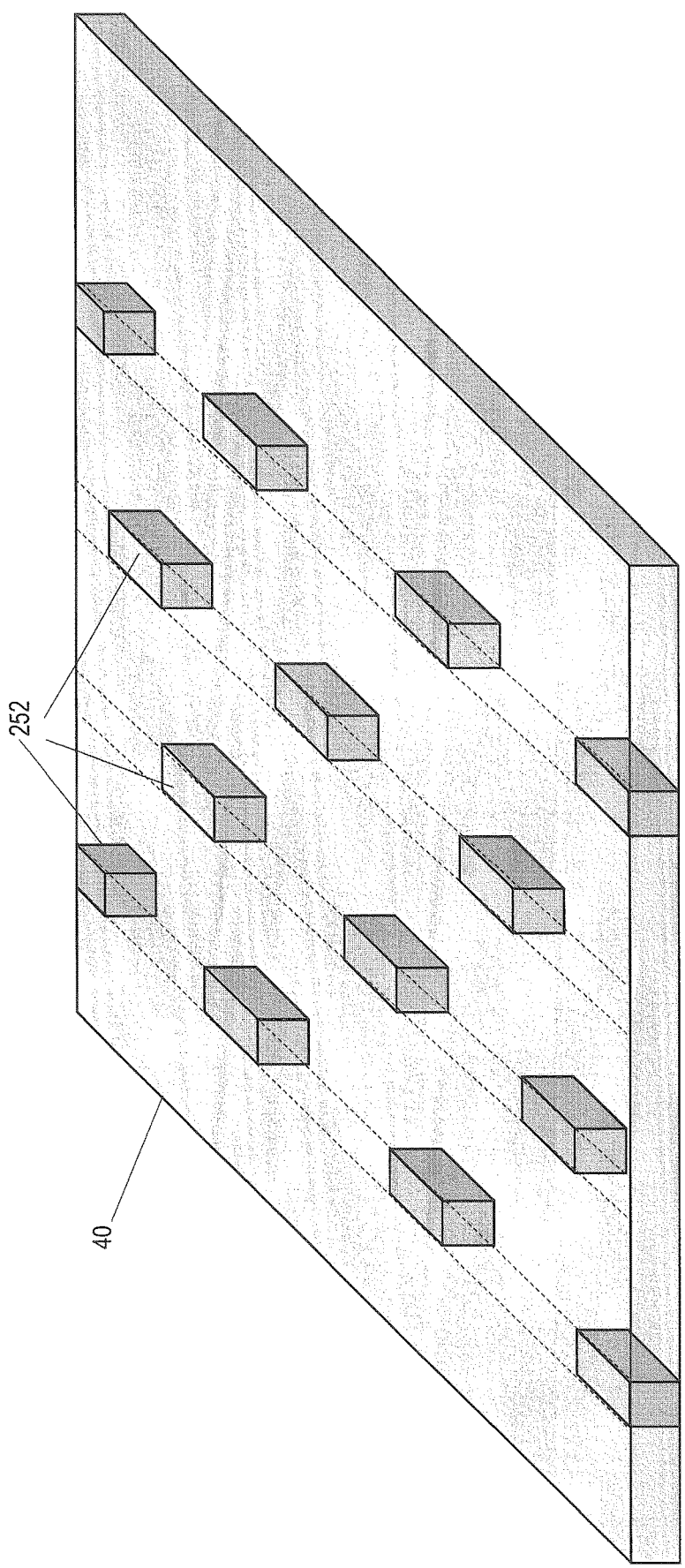
FIGS. 26 and 27 are diagrams of an adapted mat having sections that are hardened to aid acoustic conduction, for use in a further embodiment of the invention.
Figure 27:
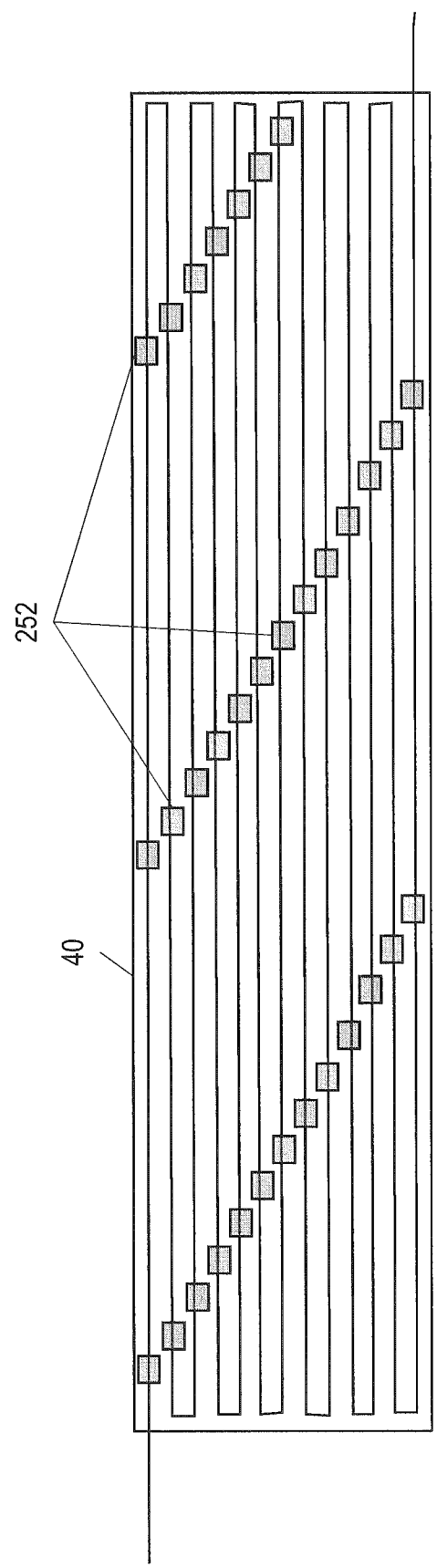

With respect to the planar mat itself, FIGS. 25 and 26 illustrate a further development, in that the mat 40, rather than being homogenous throughout, can instead be provided with regions 252 of different hardness. That is, regions 252 are typically made of a different, or denser material, which has different hardness properties from the other areas of the mat 40. The lengths of fiber 14, 24, 34, 44, and 54 would then be mounted on the mat over the regions 252 of different hardness. The regions 252 of increased hardness with respect to the remainder of the mat then provide discrete and specific sampling points for the fiber with respect to the pipe, vessel, or other surface over which or around which the flexible mat is placed. In this respect, the regions of increased hardness 252 will have different acoustic properties from the other regions of the mat which are softer, and in particular will likely cause the fiber to give a greater response to incident acoustic energy than the softer regions, which are more absorbing. Hence, the fiber that lies against the regions 252 should better detect and respond to incident acoustic energy than the fiber that lies against the softer remainder of the mat 40. More generally, therefore, the provision of the regions 252 allows for the hardness of the mat to be modulated across its surface, by virtue of providing the harder regions 252, to provide specific sampling points across the surface of the mat.

Please note that in further embodiments it may be possible to provide regions with different degrees of hardness. Therefore, with respect to FIG. 25 we describe regions 252 as having a hardness measurement higher than the remainder of the mat 40, whilst in further embodiments, the hardness of the individual regions 252 may itself be modulated, such that some regions are harder than others, so as to provide different acoustic sampling responses at different points.

With respect to the arrangement of the regions of increased hardness 252 with respect to the remainder of the mat 40, in one embodiment the regions 252 are offset from each other from each reciprocating row to row, as shown in FIG. 26. That is, as the fiber reciprocates across the mat, one or more regions of hardness 252 can be provided at particular points along a particular reciprocating length of fiber. Then, for the next, contiguous, reciprocating length of fibre, further regions of hardness 252 can be provided within the mat underneath that reciprocated length, but located at a different position along the reciprocating length, such that they are not aligned with or contiguous with the regions of hardness for the first reciprocating length of fiber. Instead, the regions 252 in the adjacent reciprocating length of fiber are offset along the length of fiber from the corresponding regions 252 positioned underneath the first length of fiber. This arrangement then continues, with each successive length of fiber having its regions of hardness 252 being offset from the preceding one across the width of the mat 40, so as to give the arrangement shown in FIG. 26.

Of course, other arrangements of the regions 252 are possible, for example, the regions 252 may be offset to a greater or lesser extent than that shown in FIG. 26. Alternatively, the regions may not be offset at all, but may instead be aligned, either completely, or partially. In other embodiments, the regions 252 may be randomly or pseudo-randomly distributed across the mat, or, may instead be distributed across the mat in a determinative manner according to some function. In further embodiments, the regions 252 may be distributed across the mat, or at least some regions of the mat, according to a mathematical function, such as, for example, a monotonic function, or the like.

In additional embodiments, the regions 252 may be distributed across the mat in accordance with their position along the reciprocating lengths of fiber. For example, a region 252 may be required every x meters along the fibre, for example where x is between 1 and 10 meters. In other embodiments the regions 252 may be distributed on the mat at regions along the length of fiber determined by a mathematical function chosen to define the spatial sensing resolution required. Various other arrangements of the regions 252 along and across the mat may be apparent and may be used.

Figure 28:
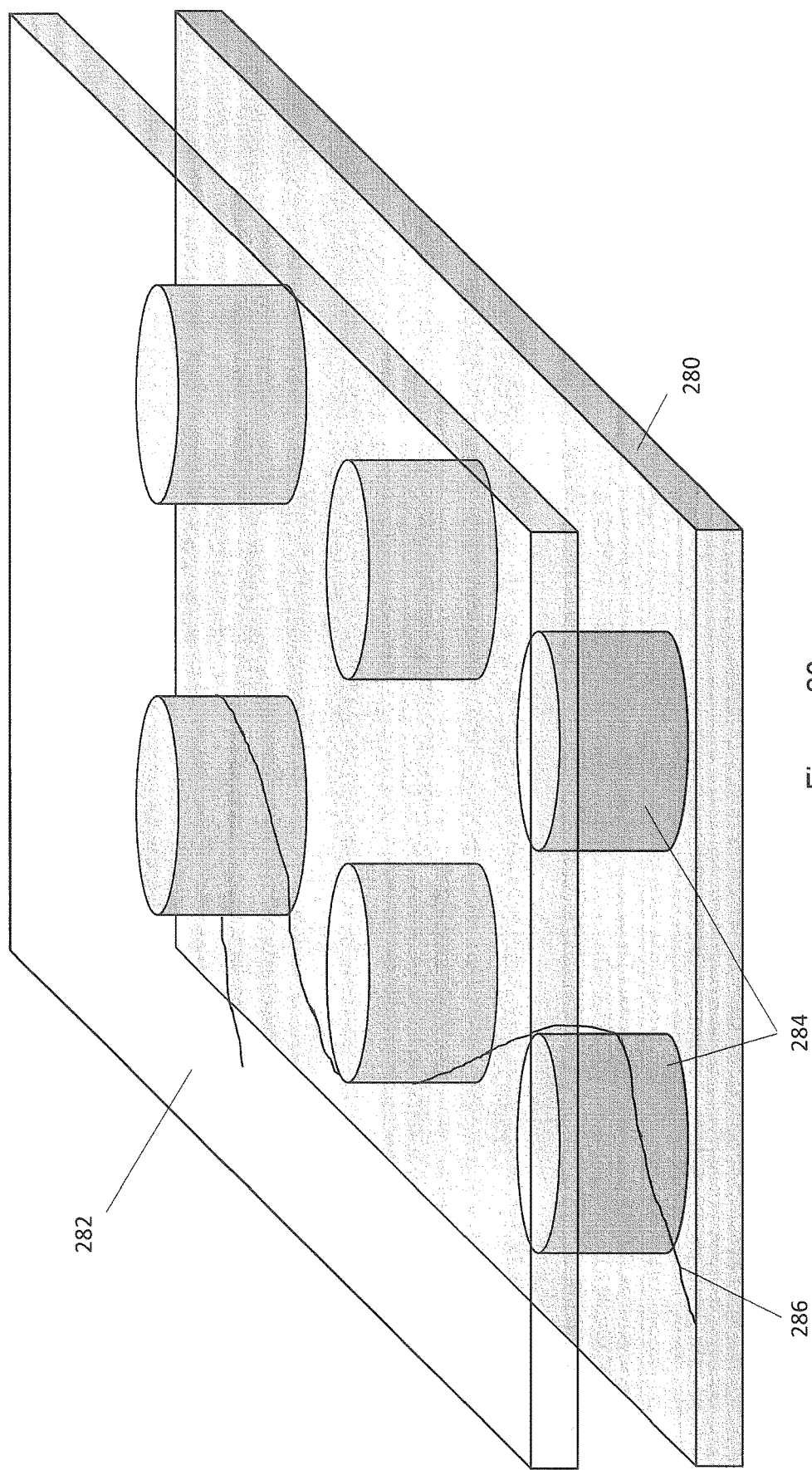
FIGS. 28 and 29 are diagrams of a further embodiment of the invention.

FIG. 28 illustrates a further, slightly different embodiment of the present invention. In this embodiment a mat type arrangement is provided which has compressible pegs or barrel structures formed from an elastomeric material, or the like, around which fiber is threaded. The compressible pegs or barrel structures around which the fiber is threaded are mounted on a flexible substrate, and then overlaid on top of the pegs is a heavy plate, having relatively speaking a large mass and inertia compared to the pegs or barrels. In operation the flexible mat bearing the compressible pegs or barrel structures is placed against a surface to be monitored, which may, for example, be the surface of a vessel, pipe, or in other embodiments may be the ground, for example for seismic detection, and then the inertial mass plate is placed on top of the pegs or barrels. The purpose of the inertial mass plate is to give a substantially fixed surface against which the compressible pegs or barrels can compress, in response to acoustic vibrations detected through the flexible surface upon which the pegs or barrels are mounted. The vibrations cause the elastomeric pegs or barrels to vibrate against the inertial plate, which due to its high inertia does not move, and hence the energy in the pegs or barrels causes the outer surface of the pegs or barrels to expand and contract slightly with the vibrations. This expansion and contraction is then detected by optical fiber that is wound around the pegs or barrels, the expansion and contractions of the pegs or barrels causing corresponding expansion and contraction, and hence strain, in the optical fiber. This strain then manifests itself in the modulation of any back scattered signals generated from light pulses passing through the optical fiber as the strain occurs, which back scatter can then be detected by a distributed acoustic sensor system, to detect the vibrations.

Figure 29:
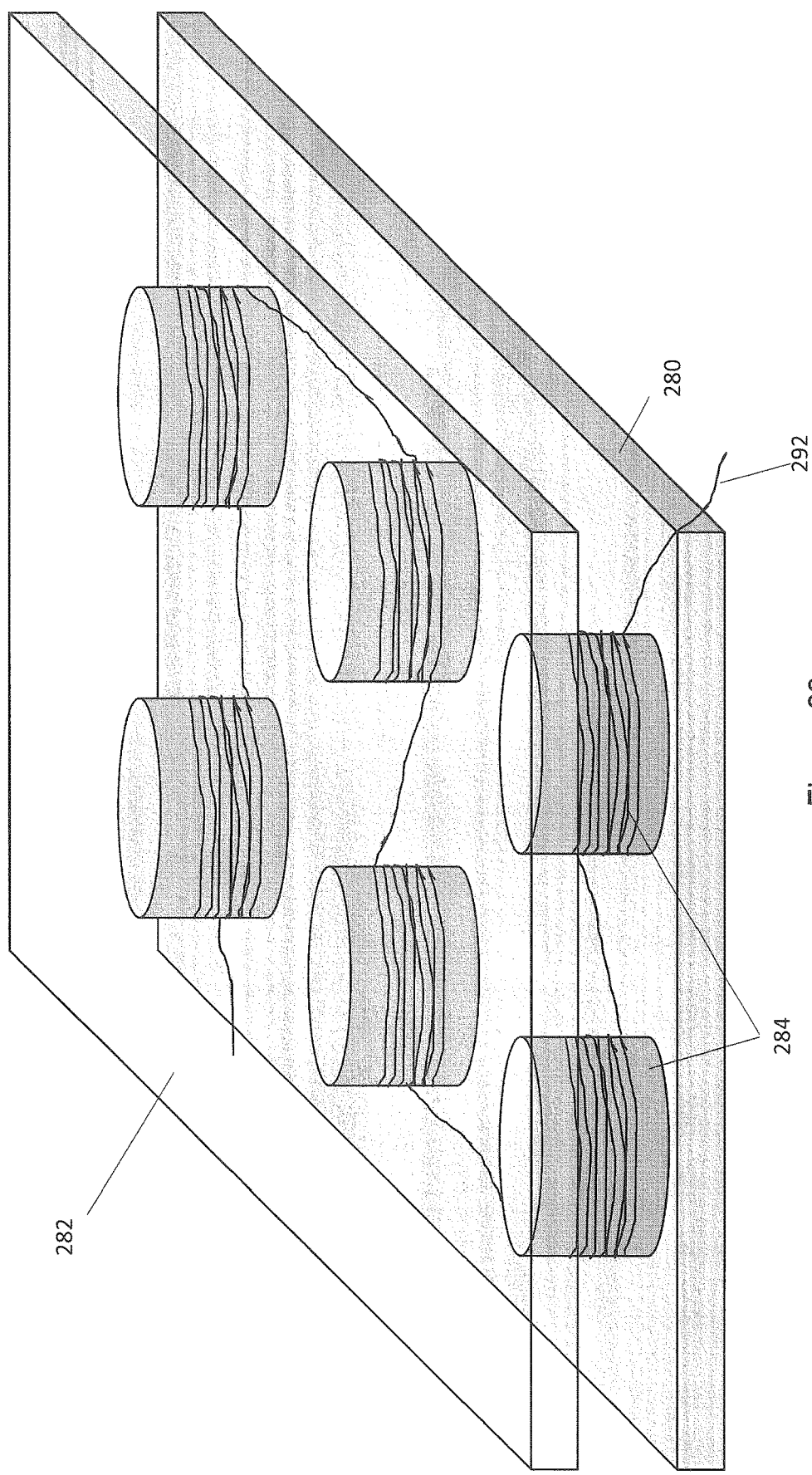

FIGS. 28 and 29 illustrates one version of the embodiment in more detail. Here, multiple elastomeric pegs or barrels 284 are provided, mounted as an array on a substrate 280. Threaded around at least some of the pegs or barrels is an optical fiber 286 (in the embodiment shown in FIG. 28) or 292 (in the embodiment shown in FIG. 29). In FIG. 28 it can be seen that the optical fiber 286 is simply threaded between the pegs as shown, or, as shown in FIG. 29, the optical fiber may be wound round each of the pegs in turn in any predetermined order. Various other ways of winding the optical fiber around the pegs would also be known, as will be apparent from the arrangements of the optical fibres 306, 308, and 310, shown in FIG. 30 described later.

Placed on top of the elastomeric plates or barrels 284 is a heavy plate 282 which acts as a large inertial mass, against which the elastomeric pegs or barrels 284 abut. Generally, the relative masses of the inertial plate 282 and the elastomeric pegs or barrels 284 is such that the inertial plate 282 is many times heavier than the elastomeric pegs or barrels 284, such that effectively, the inertial mass plate 282 acts as a barrier against which the elastomeric pegs or barrels 284 may abut and compress thereagainst.

FIGS. 34 and 35 illustrate the arrangement of a single elastomeric peg or barrel 284. As shown in FIG. 34 elastomeric peg 284, 304, is provided with optical fiber wound therearound. The inertial mass plate 282 is provided on top of the elastomeric peg, which is mounted on la ightweight substrate 280. In some embodiments, as described in more detail later, the pegs 284 need not be mounted on the substrate 280, and instead can be affixed to the inertial plate 282, in which case in use the pegs are then placed against a surface to be monitored 310, as shown in FIGS. 34 and 35, and FIG. 31.

In operation, acoustic vibrations 352, as shown in FIG. 35, which may be, for example, acoustic vibrations from any source, or seismic vibrations, impact on substrate 280 or surface 310, and travel upwards through the elastomeric peg 284, 304, causing the peg 284 and 304 to compress against the inertial plate 282, 302. Because the inertial plate 282, 302 has such a high inertial mass relative to the elastomeric pegs, the incoming acoustic vibrational energy causes the elastomeric pegs 284, 304 to compress up against the inertial plate 282, 302, and hence the outer surface of the acoustic pegs 282, 302 bulges inwards and outwards with the incoming acoustic vibrations 352, as shown. The bulging outwards of the surface causes strain in the optical fiber which is wrapped around the elastomeric peg 284, 304, which strain causes back scatter of optical pulses sent along the fiber for example from a distributed acoustic sensing system. The back scatter is modulated by the incoming acoustic waves causing vibrational bulging of the pegs or barrels, that in turn causes strain in the fiber wrapped therearound, which in its turn then modulates the backscatter from that section of fiber, which modulated back scatter can be detected by a suitable distributed acoustic sensing system, such as the Silxa® iDAS™ system, or the like. Because multiple turns of optical fiber may be placed around each peg or barrel 284, 304, very small vibrations leading to very small changes in the diameter of the elastomeric peg 284, 304 can be translated to much larger amounts of backscatter, due to the multiple optical fiber windings around the peg. Effectively, the multiple windings give a much greater length of optical fiber from which backscatter will be received relating to the particular peg 284, 304, and hence the DAS sensor is able able to integrate the received backscatter from along the length of fiber corresponding to a particular peg or barrel, to increase the back scatter signal-to-noise ratio corresponding to the incident acoustic waves.

Figure 30:
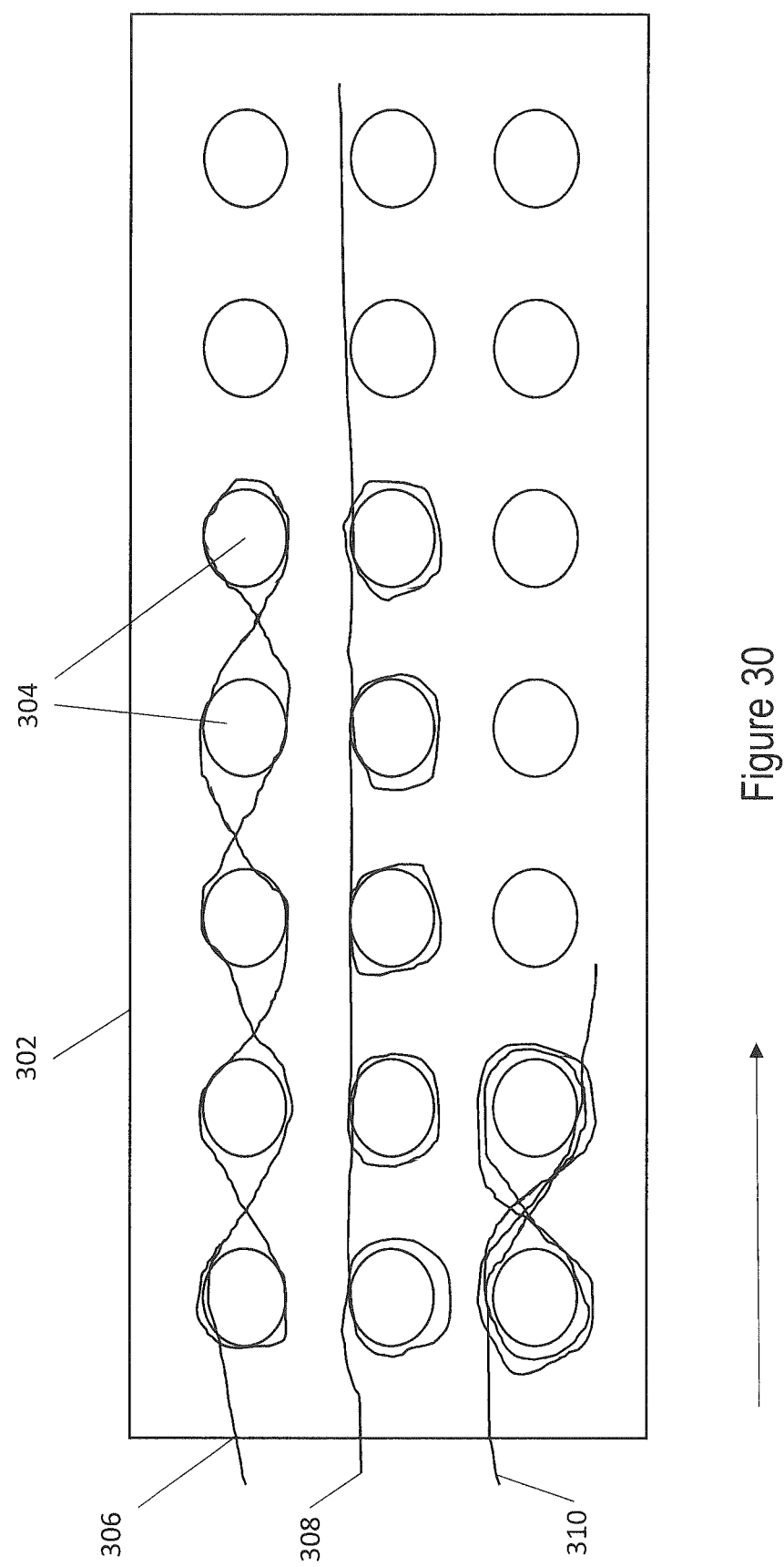
FIGS. 30 and 31 are diagrams of the further embodiment of FIGS. 28 and 29, illustrating how fiber may wrapped around the pegs or barrels thereof.
Figure 31:
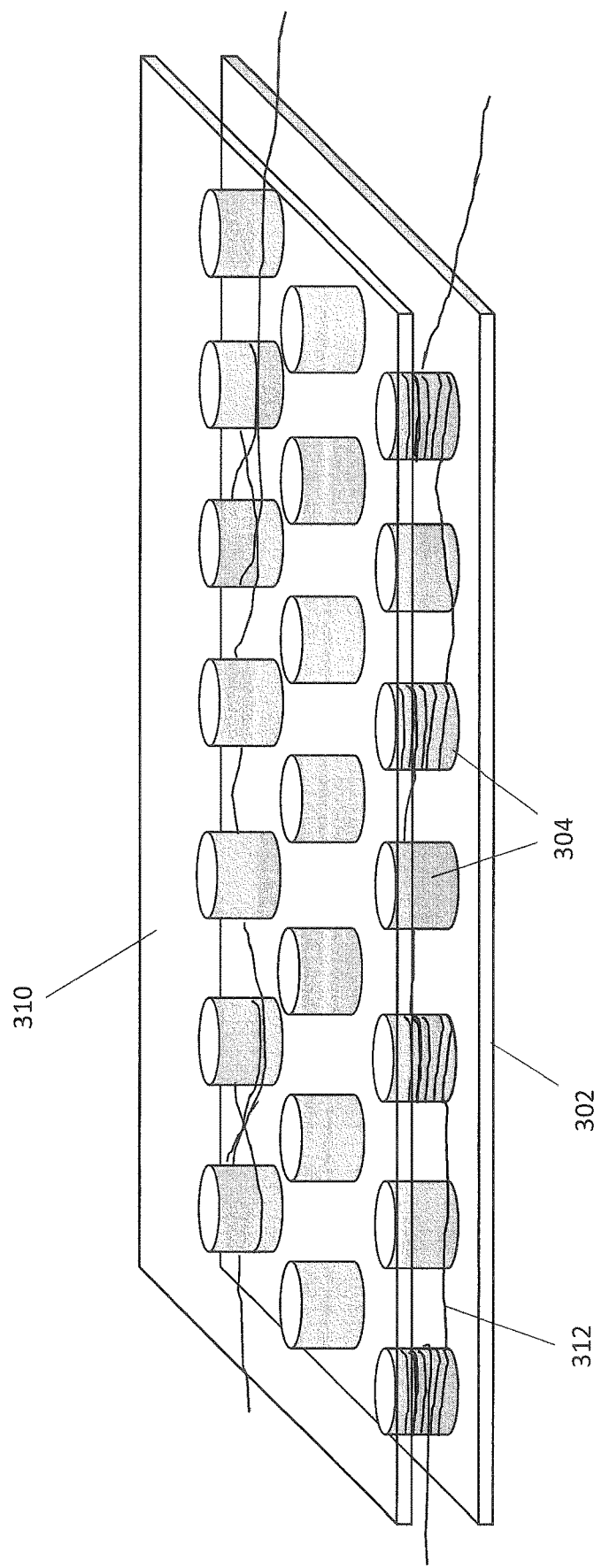

FIGS. 30 and 31 show a further variant of the arrangement, and in particular where multiple pegs 304 are provided on a substrate 302, arranged in an array which is longer than it is wider. In use the substrate 302 may be placed against a surface to be monitored 310, which may, for example, be the outside surface of a pipe, or a process vessel, for example. The pegs 304 have wrapped therearound optical fiber 306, 308, or 310, which may be wrapped in different configurations, depending upon the sensing application. For example, for eddy tracking purposes in a pipe, the fiber can be wrapped over a shorter distance, i.e. over fewer pegs, and hence may be wrapped in a figure of eight configuration as shown by optical fiber 310 in FIG. 30.

However, where the arrangement is being used for detecting seismic waves, as seismic waves have longer wave lengths then a greater length of fiber is needed for detection, and hence it is necessary to wrap the fiber over a longer length i.e. a greater number of pegs, as shown, for example, by fiber arrangements 306 and 308. In fiber arrangement 306 the fiber is looped around each peg in turn in a figure of eight configuration i.e. the fiber is threaded from peg to peg alternating from which side of the peg it abuts as it travels along the mat. Once a sufficient length of fiber has been deployed then the fiber can loop around the last peg, and then loop back in the opposite direction over the pegs, again alternating from peg to peg as to which side it wraps around, so as to give ultimately a figure of eight wrapping arrangement around the pegs. The fiber may reciprocate backwards and forwards in this manner as many times as required, to give sufficient windings around the pegs.

Fibre 308 shows an alternative arrangement, wherein each fiber is wrapped around each peg, for example helically or spirally wound around each peg, in turn for multiple turns, before the fiber then proceeds to the next peg. Combinations of the two arrangements of fibers 306 and 308 would also be possible. The main criteria for fiber wrapping around the pegs is that the fiber is wrapped tightly enough around the pegs such that any vibrational increase in diameter of the pegs due to incident acoustic vibrations can be translated to the fiber as a strain, which can then be detected by any connected DAS system.

The above described arrangements, with the elastomeric pegs or barrels, therefore provide a good mechanism by which acoustic energy can be detected from a surface, and then translated into strain in an optical fiber for detection by a DAS. In particular, the expandable peg or barrel arrangement with fiber wrapped therearound, we believe provides a good transducer for the detection of acoustic vibrations, and the conversion of those acoustic vibrations into strain on the wrapped fiber. Moreover, the peg or barrel structures can be arranged across a substrate in any desired configuration or order, depending on the application e.g. either for seismic, or flow monitoring in a pipe or process vessel.

Moreover, whilst we describe above the pegs or barrels as being cylindrical, of course, other shapes may be used around which the fiber is wrapped. For example, pentagonal, hexagonal, or octagonal shape pegs or barrels may be used, by way of example only. In terms of the size of each peg or barrel, they should preferably be of sufficient size such that the fiber may be wrapped therearound with a bend radius that is effectively lossless. Where bend insensitive fiber is used, therefore, the diameter of the barrels or pegs may be smaller than where conventional optical fiber is used. Where bend insensitive (BI) fiber is used the barrels or pegs may have a diameter of the order for 10 mm for the best BI fiber, although to minimise losses the peg or barrel diameter should be more than this, for example in the 12 to 20 mm range. In some embodiments the barrel or peg diameter may be of the order of centimetres, for example in the range 5 to 25 cm.

Figure 32:
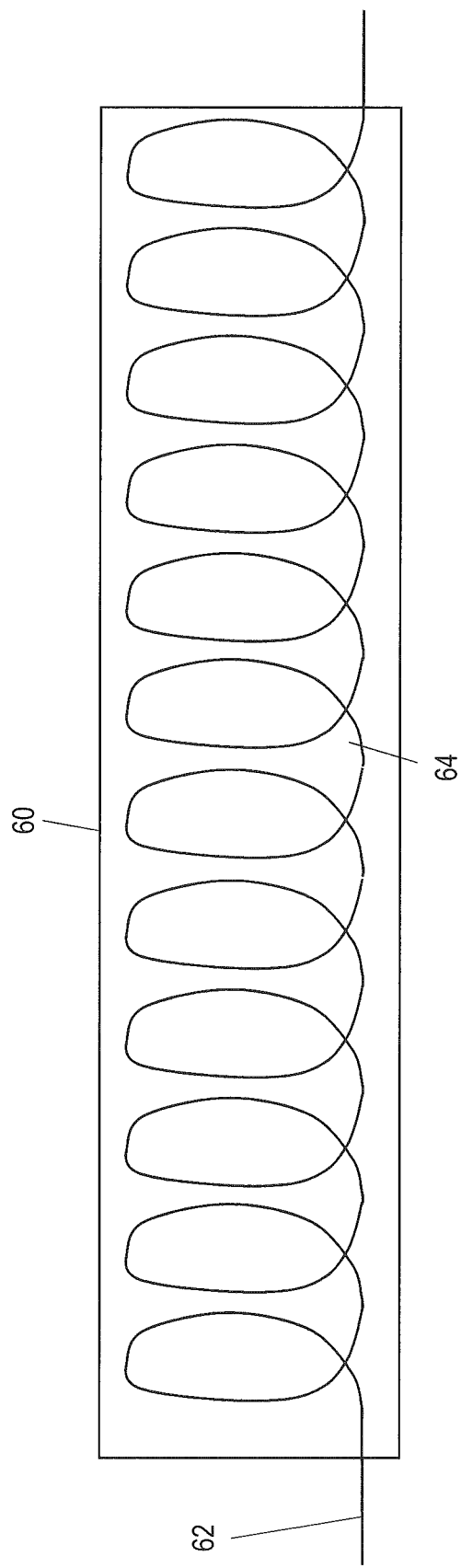
FIGS. 32 and 33 are diagrams of a further embodiment illustrating an additional pattern of fiber deployed across the flexible substrate.
Figure 33:
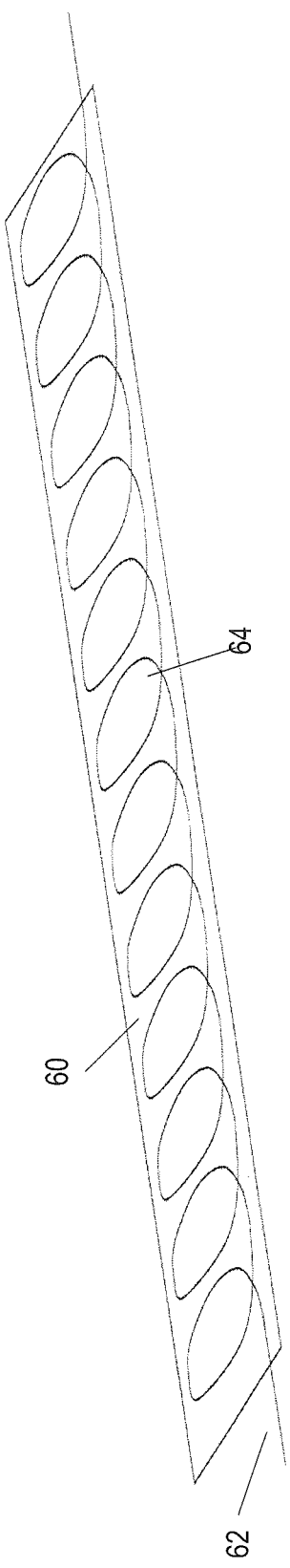

Finally, FIGS. 32 and 33 illustrate a further embodiment of a flexible mat arrangement, and in particular illustrate an alternative way to arrange the optical fiber across the mat. Here, a flexible mat substrate 60 is provided, having an optical fiber 62 arranged thereacross in a series of loops 64. The loops 64 may not overlap, as shown in FIG. 32, or, in alternative embodiments, the loops 64 may be spaced more closely together, such that each loop partially overlaps one or more next to it. The advantage of this arrangement is that a significant length of optical fiber can be arranged over the surface of the mat, and hence spatial sensing resolution is increased, but because of the looping arrangement fiber losses due to bends in the fiber are minimised, as the loops can be large enough so as to be much larger than the minimum bend radius of the fiber. Where the loops are caused to overlap then very high fiber densities can be obtained with substantially no bending losses. Moreover, neither is it necessary in this embodiment to have to take special precautions such as those as described previously with respect to FIGS. 17 and 19, to minimise fiber bending losses, due to the looping configuration of the fiber across the mat. As example loop sizes, the loops may be in the range of anywhere from 5 to 100 cm in diameter, purely by way of example. Where the loops overlap the degree of overlap can be quite high, for example from anything like 10% to 95% overlap from loop to loop.

Various modifications to the above described embodiments, whether by way of addition, deletion or substitution, will be apparent to the skilled person to provide additional embodiments, any and all of which are intended to be encompassed by the appended claims.

The invention claimed is:

1. An apparatus, comprising a flexible mat-like substrate having a length of optical fiber mounted thereon or therein for use in an optical fiber sensor system, the length of the optical fiber being arranged in a deployment pattern on said substrate, the deployment pattern being such that the optical fiber reciprocates or loops across the mat-like substrate so as to provide one or more regions having a high spatial density of fiber, such that a sensing area comprising said deployment pattern provides an increased spatial sensing resolution relative to a native sensing resolution otherwise provided by the fiber to the optical fiber sensing system, wherein the mat-like substrate comprises one or more areas of increased hardness embedded therein, the one or more areas having increased hardness relative to the remainder of the mat-like substrate, the arrangement being such that the fiber lays over the areas of increased hardness such that the one or more areas of increased hardness provide discrete and specific sampling points for the fiber on a surface of the mat-like substrate, the one or more areas of increased hardness having different acoustic properties from other regions of the mat-like substrate, causing the fiber to give a greater response to incident acoustic energy than the other regions of the mat-like substrate.

2. An apparatus according to claim 1, wherein the sensing area includes one or more areas where the deployment pattern of the fiber reciprocates back and forth across the substrate from substantially one side of the substrate to another side.

3. An apparatus according to claim 2, wherein the deployment pattern reciprocates from either:
   i) a first side to an opposite second side; or
   ii) a first side to an adjacent second side.

4. An apparatus according to claim 1, wherein the substrate has an aspect ratio of length to width such that it is substantially longer than it is wide.

5. An apparatus according to claim 4, wherein the length of the substrate is at least 4 times the width of the substrate.

6. An apparatus according to claim 4, wherein the deployment pattern reciprocates back and forth across the mat-like substrate substantially in alignment with one of:
   a) the long side of the substrate; or
   b) the short side of the substrate.

7. An apparatus according to claim 1, wherein the deployment pattern reciprocates across the mat-like substrate, at least some of the reciprocating lengths of fiber being connected from one length to next by one or more of:
   i) a fiber loop of a size to minimize bending losses; and/or
   ii) an optical fiber connector having a 180 degree bend.

8. An apparatus according to claim 1, wherein the deployment pattern reciprocates across the mat-like substrate, at least some of the reciprocating lengths of fiber being connected to non-contiguous lengths of fiber.

9. An apparatus according to claim 8, wherein a first length of fiber is connected to a second length of fiber across the deployment pattern, at least two lengths of fiber being disposed between the first length of fiber and the second length of fiber in a direction extending across the mat-like substrate.

10. An apparatus according to claim 1, wherein the deployment pattern comprises reciprocating lengths of fiber that reciprocate across the mat-like substrate with a pitch determined by a mathematical function.

11. An apparatus according to claim 10, wherein the mathematical function is selected from a group comprising: a monotonic function, a trigonometric function, a logarithmic function, an exponential function, or a hyperbolic function.

12. An apparatus according to claim 10, wherein the mat-like substrate provides two or more areas where the pitch is determined with respective different mathematical functions.

13. An apparatus according to claim 1, wherein where the fiber is arranged in reciprocating lengths across or along the substrate the areas of increased hardness are offset from one another from row to row of fiber.

14. An apparatus according to claim 1, wherein the deployment pattern comprises a series of fiber loops of such a size so as to be larger than the minimum bend radius of the optical fiber.

15. An apparatus according to claim 14, wherein consecutive ones of the fiber loops partially overlap across at least a portion of the substrate.

16. An apparatus comprising a plurality of flexible mat-like substrates according to claim 1, connected in series by a common optical fiber.

17. An apparatus according to claim 1, further comprising a distributed optical fiber based sensor system, wherein the optical fiber of the flexible mat-like substrate in use is connected to and receives signal pulses from the distributed optical fiber based sensor system.

18. An apparatus according to claim 1, further comprising a pipe to be monitored, the arrangement being such that the flexible mat-like substrate is at least partially wrapped around the pipe to be monitored at one or more areas where the pipe is to be monitored.

19. An apparatus according to claim 1, wherein the fiber is disposed on an outer surface of at least one of the one or more areas of increased hardness.

20. An apparatus, comprising a flexible mat-like substrate having a length of optical fiber mounted thereon or therein for use in an optical fiber sensor system, the length of the optical fiber being arranged in a deployment pattern on or in said substrate, the deployment pattern being such that the optical fiber reciprocates or loops across the mat-like substrate so as to provide one or more regions having a high spatial density of fiber, such that a sensing area comprising said deployment pattern provides an increased spatial sensing resolution relative to a native sensing resolution otherwise provided by the fiber to the optical fiber sensing system, wherein the mat-like substrate comprises one or more raised protrusions formed on a surface thereof, wherein the fiber is embedded within a body of the one or more raised protrusions, such that in use an upper surface of the one or more protrusions provides a discrete sensing region.

* * * * *